United States Patent
Chitrakar et al.

(10) Patent No.: US 12,160,283 B2
(45) Date of Patent: Dec. 3, 2024

(54) COMMUNICATION APPARATUS AND COMMUNICATION METHOD FOR MULTI-AP JOINT RE-TRANSMISSION

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 325 days.

(21) Appl. No.: 17/606,712

(22) PCT Filed: Feb. 27, 2020

(86) PCT No.: PCT/SG2020/050091
§ 371 (c)(1),
(2) Date: Oct. 26, 2021

(87) PCT Pub. No.: WO2020/231326
PCT Pub. Date: Nov. 19, 2020

(65) Prior Publication Data
US 2022/0209825 A1    Jun. 30, 2022

(30) Foreign Application Priority Data
May 10, 2019  (SG) .............................. 10201904246S

(51) Int. Cl.
| | |
|---|---|
| *H04B 7/024* | (2017.01) |
| *H04L 1/1607* | (2023.01) |
| *H04W 28/02* | (2009.01) |
| *H04W 28/12* | (2009.01) |
| *H04W 56/00* | (2009.01) |
| *H04W 76/15* | (2018.01) |
| *H04W 80/02* | (2009.01) |

(52) U.S. Cl.
CPC .......... *H04B 7/024* (2013.01); *H04L 1/1614* (2013.01); *H04W 28/02* (2013.01); *H04W 28/12* (2013.01);
(Continued)

(58) Field of Classification Search
CPC ...... H04B 7/024; H04L 1/1614; H04W 28/02; H04W 28/12; H04W 56/0015;
(Continued)

(56) References Cited

U.S. PATENT DOCUMENTS

| | | |
|---|---|---|
| 2015/0003330 A1 | 1/2015 | Morita |
| 2015/0288427 A1 | 10/2015 | Wang et al. |

(Continued)

FOREIGN PATENT DOCUMENTS

| | | |
|---|---|---|
| CN | 109314882 A | 2/2019 |
| CN | 109672492 A | 4/2019 |
| CN | 109672512 A | 4/2019 |

OTHER PUBLICATIONS

International Search Report, mailed Jun. 17, 2020, for International Application No. PCT/SG2020/050091, 5 pages.
(Continued)

*Primary Examiner* — Sharmin Chowdhury
(74) *Attorney, Agent, or Firm* — Seed IP Law Group LLP

(57) ABSTRACT

An access point (AP) includes a receiver, which, in operation, receives a Joint Transmission (JT) Trigger frame from another AP that indicates MAC protocol data units (MPDUs) to be jointly transmitted to a communication apparatus; and a local memory that stores one or more MPDUs previously transmitted to the communication apparatus.

3 Claims, 35 Drawing Sheets

(52) U.S. Cl.
CPC ....... *H04W 56/0015* (2013.01); *H04W 76/15* (2018.02); *H04W 80/02* (2013.01)

(58) Field of Classification Search
CPC ..... H04W 76/15; H04W 80/02; H04W 84/12; H04W 84/20; H04W 88/08
See application file for complete search history.

(56) References Cited

U.S. PATENT DOCUMENTS

| | | |
|---|---|---|
| 2016/0381665 A1 | 12/2016 | Callard et al. |
| 2021/0126900 A1* | 4/2021 | Qu .......................... H04L 49/55 |
| 2021/0127290 A1* | 4/2021 | Yang ...................... H04W 72/27 |
| 2021/0307099 A1* | 9/2021 | Ryu ....................... H04W 76/15 |
| 2022/0174545 A1* | 6/2022 | Tanaka ................... H04B 7/024 |

OTHER PUBLICATIONS

Ray et al., "RTS/CTS-Induced Congestion in Ad Hoc Wireless LANs," 2003 IEEE Wireless Communications and Networking Conference (WCNC), New Orleans, LA, USA, Mar. 16-20, 2003. (6 pages).

Singaporean Office Action, dated Sep. 13, 2022, for Singaporean Patent Application 2 No. 11202111910Y. (11 pages).

Extended European Search Report, dated May 31, 2022, for European Application No. 20806100.2-1206, 7 pages.

\* cited by examiner

COMMUNICATION APPARATUS AND COMMUNICATION METHOD FOR MULTI-AP JOINT RE-TRANSMISSION

BACKGROUND

1. Technical Field

The present disclosure generally relates to communication apparatus and methods for electronic devices and systems, and more particularly relates to joint re-transmission in multi-AP networks.

2. Description of Related Art

Wireless networks that communicate via multi-AP joint transmission enable electronic devices to communication in networks with joint transmissions sent to multiple electronic devices. Such networks have advantages over other wireless networks in which wireless communication is limited to a single transmission to one electronic device.

SUMMARY

One non-limiting and exemplary embodiment facilitates providing joint transmission and re-transmission communication in multi-AP networks. By way of example, this communication includes joint re-transmission between two or more access points (APs) and one or more wireless stations (STAs).

One example embodiment is an access point (AP) that includes a receiver, which, in operation, receives a Joint Transmission (JT) Trigger frame from another AP that indicates MAC protocol data units (MPDUs) to be jointly transmitted to a communication apparatus; and a local memory that stores one or more MPDUs previously transmitted to the communication apparatus.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

Figure 1:
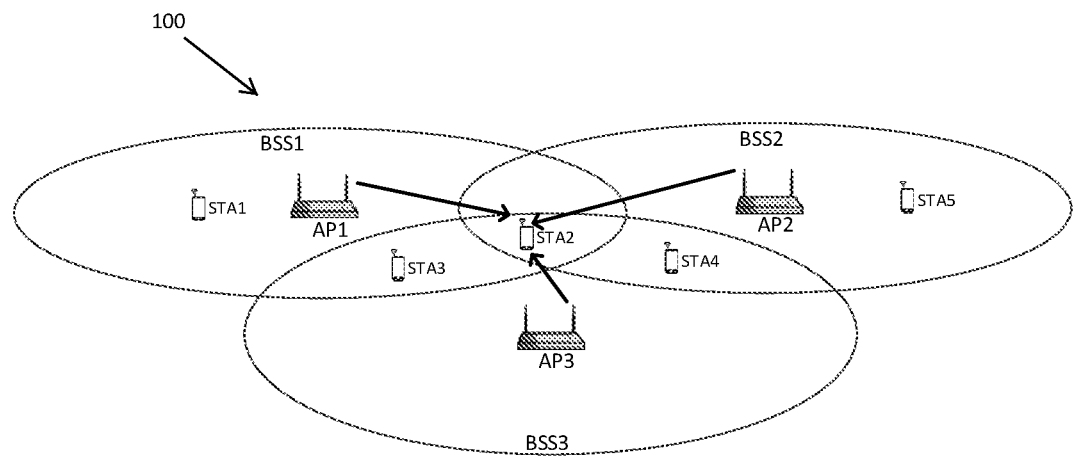
FIG. 1 is a wireless network with a multi-AP system in accordance with an example embodiment.

Skilled artisans will appreciate that elements in the figures are illustrated for simplicity and clarity and have not necessarily been depicted to scale.

DETAILED DESCRIPTION

Electronic devices can be configured to transmit and receive joint transmission (JT) data in multi-AP networks. These electronic devices have many advantages over conventional electronic devices that are limited to single transmissions to a single electronic device. Performing joint transmissions in multi-AP networks, however, has numerous technical problems.

Existing 802.11 BSSs (Basic Service Sets) operate as a standalone unit. The APs of each BSS provide wireless communication service only to the wireless stations (STA) that are associated with the respective APs. The data rate that the AP can provide for the wireless link to an associated STA depends on the MCS (modulation and coding scheme) used for the link, which in turn depends on the SINR (signal-to-interference-plus-noise ratio) of each STA. Typically higher MCS can be achieved at higher SINR, while only a low MCS may be possible at low levels of SINR. In a standalone BSS, while the signal ratio may be controlled by the AP by adjusting the Transmit Power, the interference experience by a STA is much more difficult to control. This problem is especially true for STAs that exist at the edge of a network and that are within the wireless range of multiple BSSs (also known as the OBSS (Overlapping BSS) zone). A useful signal in one BSS is essentially interference for the STAs of another BSS.

Multi-AP coordination (e.g., coordination among the APs of neighboring BSSs) can be used as an effective way for improving the SINR of member STAs. Such schemes are made possible by the proliferation of APs, such as dense AP deployment in a managed network (e.g. enterprise network, stadium settings, etc.) or in-home networks (e.g., with multi-AP home mesh networks).

The various multi-AP coordination schemes can may be divided into two general groups. The first group includes schemes that attempt to reduce the interference to OBSS through Transmit power control, coordinated beamforming, coordinated Null-forming, coordinated scheduling, etc. The second group includes schemes that attempt to increase the signal level at a STA through synchronized transmission by multiple APs to the same STA. Schemes of the second group may be known as Multi-AP Joint Processing or Multi-AP Joint Transmission, or Distributed MU-MIMO.

Joint Transmission not only improves the signal level, but also decreases interference by converting the interfering signal to desired signal. Example embodiments thus solve technical problems associated with STAs in overlapping BSSs or multi-AP systems by reducing interference to the STAs and improving SINR to the STAs. These problems include how to distribute and synchronize Joint Transmission Data (Joint MU-MIMO Data) among Slave APs and other problems discussed herein.

One example embodiment is an access point (AP) that includes a receiver, which, in operation, receives a Joint Transmission (JT) Trigger frame from another AP that indicates MAC protocol data units (MPDUs) to be jointly transmitted to a communication apparatus; and a local memory that stores one or more MPDUs previously transmitted to the communication apparatus.

Another example embodiment is an access point (AP) that includes circuitry, which, in operation, determines that a communication apparatus failed to receive one or more MAC protocol data units (MPDUs) that were jointly transmitted by the AP and another AP to the communication apparatus; and a transmitter, which, in operation, transmits a Joint Transmission (JT) Trigger frame to the another AP without re-distributing failed MPDUs to the another AP.

FIG. 1 is a wireless network with a multi-AP system 100 in accordance with an example embodiment. By way of example, the system 100 includes three BSSs (shown as BSS1, BSS2, and BSS3). Each BSS has at least one AP (shown as AP1, AP2, and AP2). A plurality of STAs (shown as STA1-STA5) are distributed throughout the system. STA1 exists in a single BSS (BSS1); STA2 exists in three overlapping BSSs (BSS1-BSS3); STA3 exists in two overlapping BSSs (BSS1 and BSS3); STA4 exists in two overlapping BSSs (BSS2 and BSS3); and STA5 exists in a single BSS (BSS2).

In the FIG. 1, although STA2 is associated with AP3, the three APs (AP1, AP2 and AP3) may coordinate their transmission to simultaneously transmit to STA2. This simultaneous transmission increases the SINR level at STA2 and facilitates the use of higher MCS which translates to higher throughput for STA2.

Although Multi-AP Coordination schemes typically utilize some sort of time synchronization among the participating APs, the level of synchronization utilized is highest for Joint Transmission, especially for Distributed MU-MIMO. Due to this, one or more example embodiments implement Joint Transmission in which one AP (called the Master AP) provides the synchronization signal and the other participating APs (called Slave APs) are in range of the Master AP. In FIG. 1, AP3 would be the Master AP while AP1 and AP2 are Slave APs. The Master AP may also be known by alternate names such as Coordinating AP, or Joint Transmission (JT) AP, or a multi-AP Controller etc., while the Slave AP may also be known as multi-AP device, or coordinated AP, etc.

In an example embodiment and as discussed in more detail below, Joint Transmission includes all participating APs to transmit the same signal to the STA. This includes the MAC layer specific fields be equivalent with all participating APs.

Figure 2A:
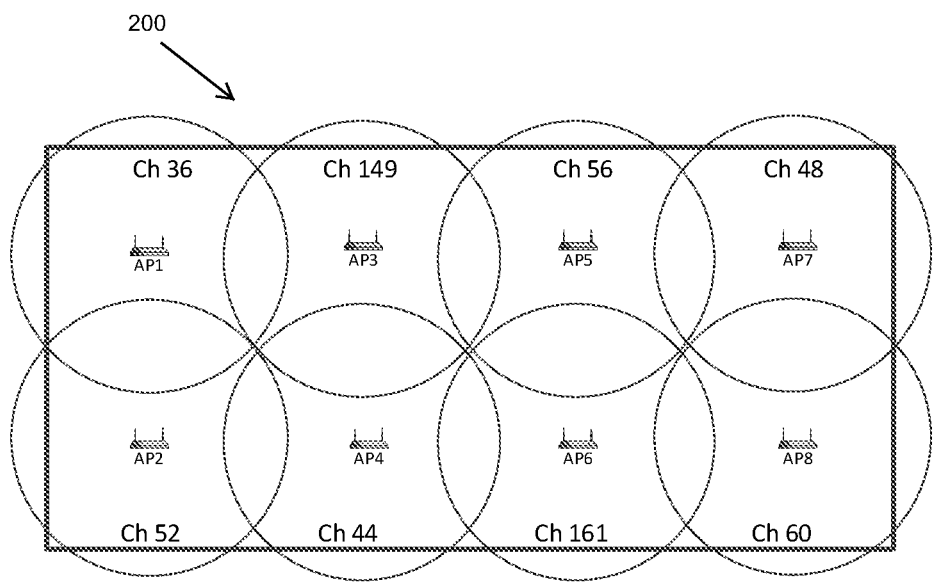
FIG. 2A is a multi-AP system shown as an enterprise network in accordance with an example embodiment.

FIG. 2A is a multi-AP system 200 shown as an enterprise network in accordance with an example embodiment. By way of example, the system includes multiple APs (shown as AP1-AP8) broadcasting with overlapping transmissions. Each AP operates a respective channel (Ch), such as AP1 at Ch 36, AP2 at Ch 52, AP3 at Ch 149, AP4 at Ch 44, AP5 at Ch 56, AP6 at Ch 161, AP7 at Ch 48, and AP8 at Ch 60.

In enterprise networks, APs position and frequency allocation are carefully planned during deployment to maximize capacity. As shown in FIG. 2A, adjacent APs use non-overlapping channels to minimize inter-BSS interference. APs can use high gain directional antennas with narrow beam width. Adjacent APs may not be in wireless range of each other. Multiple APs or all APs can use the same Service Set Identifier (SSID). Further, APs are connected using Ethernet and may be configured and/or controlled by a central AP Controller. Most edge STAs would be within coverage of at least two APs. AP to AP communication can use, for example, Ethernet or out-of-band Mesh wireless direct links. Even though neighboring APs are allocated non-overlapping primary channels, when wide-band channels are used it is inevitable that inter-BSS interference will be present in the OBSS zones. Since most enterprise networks are centrally managed and coordination among APs is easier and hence enterprise networks are a prime candidate for a Joint Transmission systems.

Figure 2B:
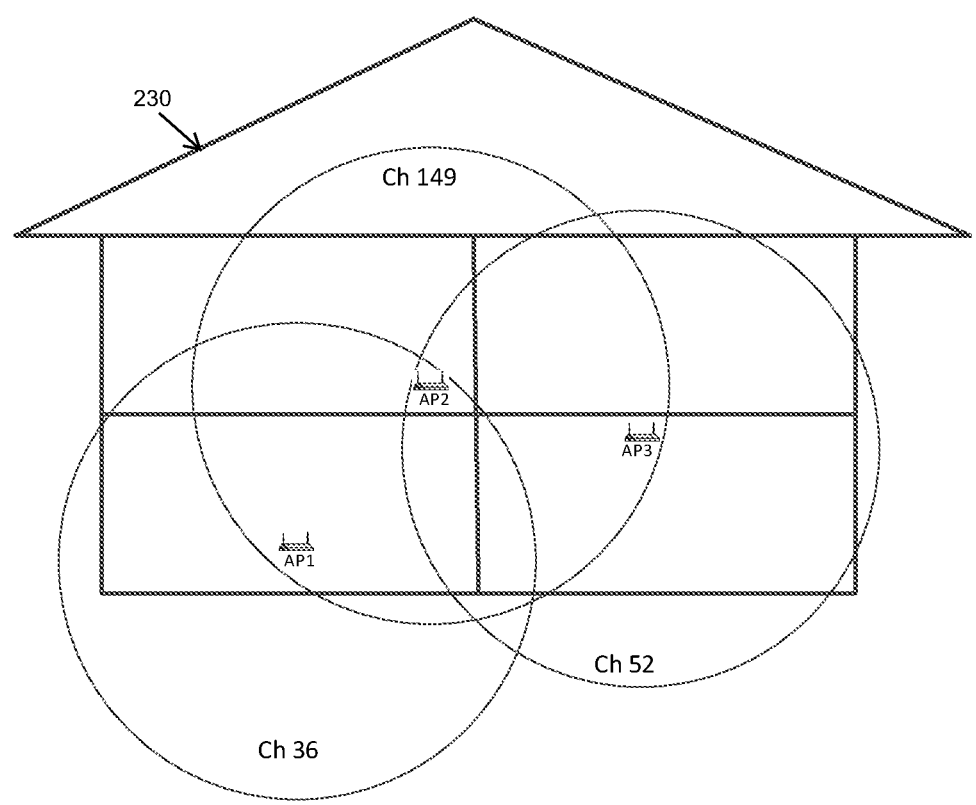
FIG. 2B is a multi-AP system shown as a home or office network in accordance with an example embodiment.

FIG. 2B is a multi-AP system 230 shown as a home or office network in accordance with an example embodiment. By way of example, the system includes multiple APs (shown as AP1-AP3) broadcasting with overlapping transmissions. Each AP operates a respective channel, such as AP1 at Ch 36, AP2 at Ch 149, and AP3 at Ch 52.

Multi-AP systems (e.g. Wi-Fi EasyMesh) is an example configuration to provide Wi-Fi coverage across an entire area, such as a house or office. AP position and frequency allocation are planned to maximize coverage. For example, one AP may act as a Multi-AP controller while the rest of the APs act as Multi-AP agents. APs can be expected to be in wireless coverage of at least one other AP. A Backhaul BSS is setup for AP to AP signaling. The Backhaul BSS may use a different SSID from the fronthaul SSID. Most edge STAs would be within coverage of at least two APs. Furthermore, AP to AP communication can use wireless direct links or a mix of wireless and wired links. Such multi-AP home or small office networks are also a good candidate for a Joint Transmission systems.

Figure 2C:
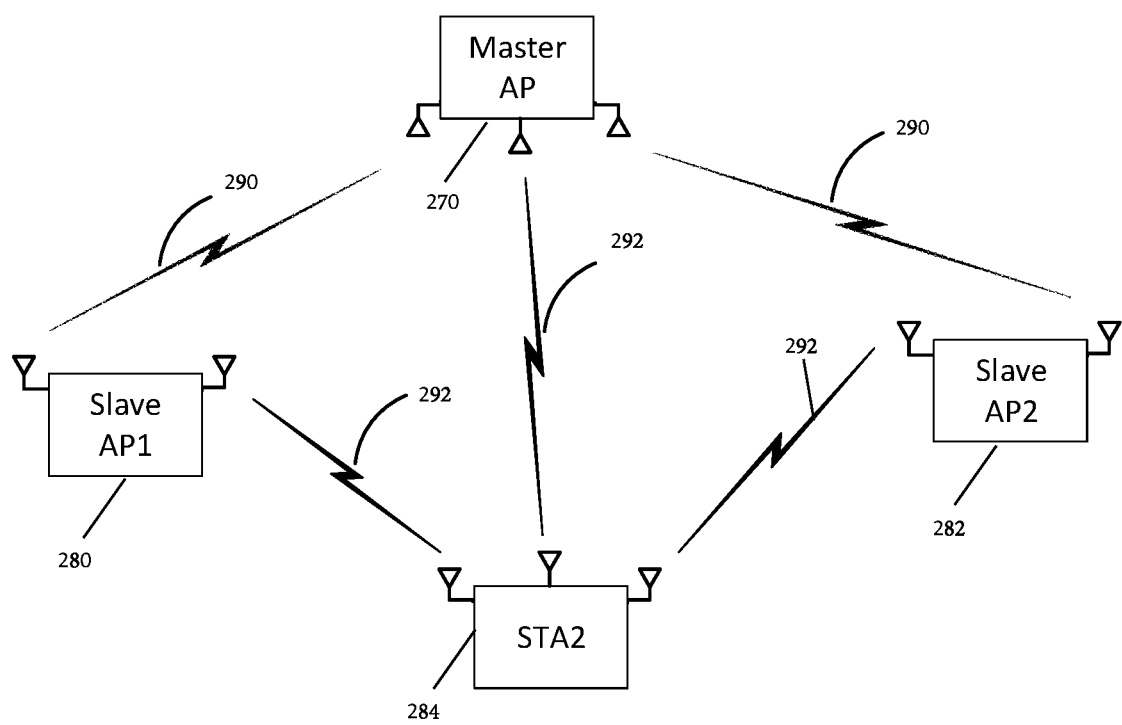
FIG. 2C is a multi-AP system shown as a Master-Slave configuration in accordance with an example embodiment.

FIG. 2C is a multi-AP system 260 shown as a Master-Slave configuration in accordance with an example embodiment. By way of example, the system includes a Master AP 270, two Slave APs 280 and 282, and a STA 284. AP to AP communication occurs over links 290, and communication between APs and the STA occurs over links 292.

For Joint Transmission, the APs possess the transmission data (upper layer data) that is to be jointly transmitted to a STA prior to the actual Joint Transmission. In one or more example embodiments, however, possessing the transmission data may not be enough in order to realize the SINR gains of Joint Transmission. The actual data symbols that are transmitted on the air need to be synchronized among the participating APs, such as multiple APs or all APs. This means that the PHY layer and MAC layer processing of the transmission data are the same among the participating APs. Example embodiments include systems, apparatus, and methods to distribute and synchronize the data for Multi-AP Joint Transmission.

In one or more example embodiments, Joint Transmission takes place in two phases: Distribution of JT data to Slave APs and Joint Transmission to the Target STA.

In the first phase (Distribution of Joint Transmission Data to Slave APs), the data to be jointly transmitted is distributed to the participating Slave APs prior to the actual joint transmission over the AP to AP link, such as link 290 in FIG. 2C. The distribution may take place over the wireless backhaul link between the APs, or it may also happen over wired backhaul link between the APs, e.g., Ethernet. When wireless backhaul is used, prior to initiating Joint transmission, the Slave APs may have associated with the Master AP on a separate BSS setup by the Master AP for the purpose of communication among the APs. The wireless channel used for the backhaul link among APs may be different from the fronthaul link between the APs and the Target STA.

In the second phase (Joint Transmission to the Target STA), actual joint transmission by two or more participating APs to the Target STA occurs over a link, such as wireless links 292 in FIG. 2C. The joint transmission may be preceded by a synchronization signal from the Master AP over the link 290, which may be called the Slave Trigger frame or the Joint Transmission (JT) Trigger frame. In some scenarios, the Master AP may also participate in the joint transmission while in some scenarios the Master AP may not take part in the joint transmission but only the Slave APs may participate. Different Sets of APs may be involved in joint transmissions to different Target STAs.

Figure 3:
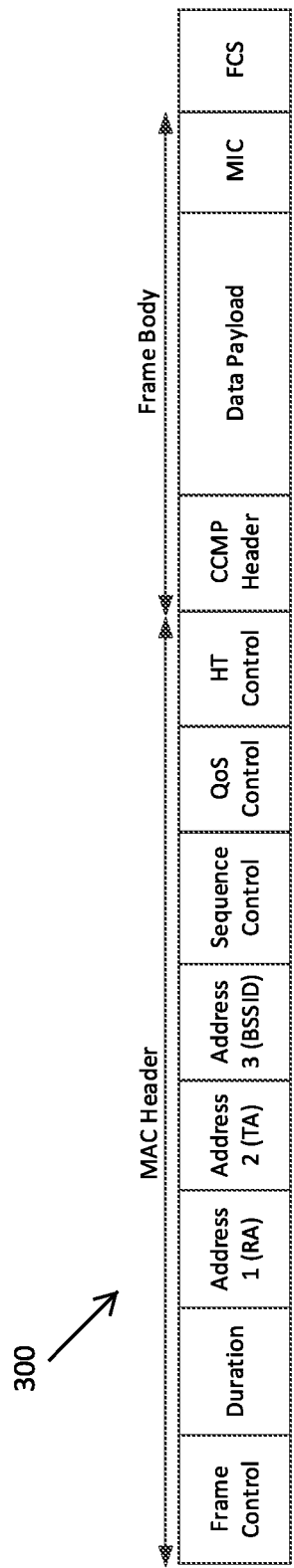
FIG. 3 is MAC Protocol Data Unit (MPDU) in accordance with an example embodiment.

FIG. 3 is MAC Protocol Data Unit (MPDU) 300 to be jointly transmitted in accordance with an example embodiment. The MPDU includes a MAC Header and a Frame Body. The MAC Header includes Frame Control, Duration, Address 1 (Receiver Address), Address 2 (Transmitter Address), Address 3 (BSSID), Sequence Control, QoS Control, and HT Control. The Frame Body includes Data Payload, MIC, and FCS. The Address 3 field carries the BSSID if the Data frame carries an A-MSDU, otherwise the Address 3 field carries the Source Address (SA) i.e. the MAC address of the device that is the source of the Data payload.

In order to realize the SINR gains of Joint Transmission, the actual data symbols that are transmitted on the air are synchronized among the participating APs. Further, the PHY layer and MAC layer processing of the transmission are the same among the participating APs. Typically, for normal transmissions (e.g., non-joint transmissions), the upper layer (e.g., IP layer) passes the data payload (e.g., IP packets) to be transmitted to the MAC layer which performs the MAC layer processing, such as pre-pending the MAC headers, adding FCS, MAC padding if required, etc. to create the MPDU (MAC Protocol Data Unit) 300. If protection is enabled, the data payload may be further subjected to encryption procedure which results in the addition of the CCMP Header field and the MIC fields to the MAC frame body. The MPDU is then passed down to the PHY layer for PHY layer processing such as pre-pending the PHY preamble, applying PHY encodings, adding PHY padding etc. to create the PPDU (PHY Protocol Data Unit) and finally transmitting the PPDU out on the air.

For Joint Transmission, participating APs need to be aware of the MAC and PHY parameters to be applied to the data payload. In addition, at the MAC layer, there are several fields that are locally generated. While some fields like Frame Control, Address 2 (TA), Address 3 (BSSID), QoS Control, HT Control may be overwritten by the MAC layers of the Slave APs to match the fields generated by the Master APs, some fields like Sequence Control, CCMP Header are different for each MPDU and are typically generated locally at each AP; hence such fields are more difficult to synchronize among the APs. In addition, more than one MPDU may also be aggregated at the MAC layer to form the A-MPDU (Aggregated MPDU), or one MPDU may constitute a S-MPDU (Single MPDU). In order to synchronize the data to be jointly transmitted among the MAC layers of all participating APs, the Master AP may generate and distribute the actual MAC layer A-MPDU or S-MPDU to all the participating Slave APs. The Sequence Control field in the MPDUs are also generated by the Master AP and the same number space is used for the Sequence Number sub-field of the Sequence Control field for both direct transmission (i.e. sing AP transmission) from the Master AP to the Target STA as well as for joint transmissions. If encryption is enabled, the Master AP also encrypts the Data payload and appends the MIC field. In this case, the Joint Transmission (JT) Data refers to the MAC layer data that is to be jointly transmitted.

In some cases, the Master AP may not be involved in the actual joint transmission phase (e.g., only the Slave APs may participate in the joint transmission). This may happen when the Master AP is implemented as a central controller and is far from the Target STA. In this case, the Target STA would be associated with one of the Slave APs and not the Master AP.

In such cases where the Target STA is associated with a Slave AP, during the data distribution phase, the Master AP sets the MAC header fields of MPDU 300 such that the MPDU appears to be generated by the Slave AP with which the Target STA is associated, e.g., the Address 2 (TA) field and Address 3 (BSSID) are set to the MAC address of the Slave AP. The Master AP also queries the Slave AP for the next Sequence Control to be used, and optionally the CCMP Packet Number (PN) and encryption Key ID to be used for transmission to the Target STA and sets the fields of the MPDU 300 respectively. The Sequence Control field in the MPDUs in this case are generated by the Slave AP and the same number space is used for the Sequence Number sub-field of the Sequence Control field for both direct transmission (i.e. sing AP transmission) from the Slave AP to the Target STA as well as for joint transmissions.

Figure 4:
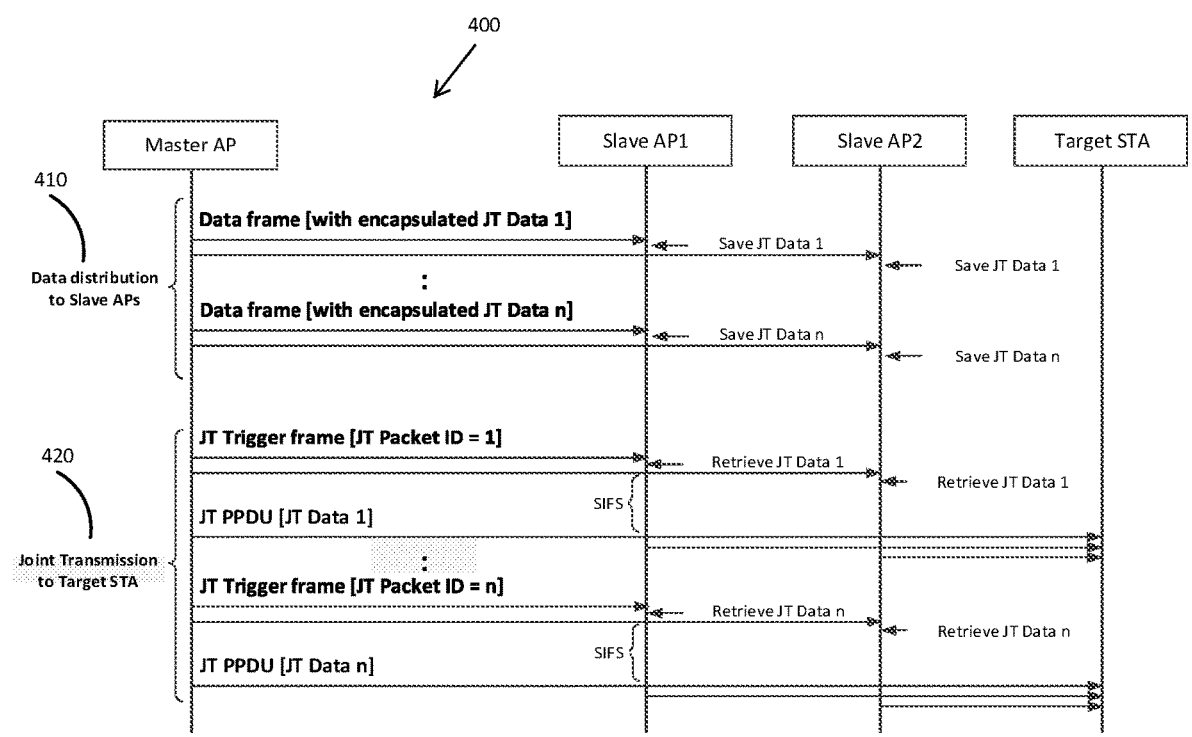
FIG. 4 is a message sequence in Joint Transmission in a multi-AP system in accordance with an example embodiment.

FIG. 4 is a message sequence 400 in Joint Transmission in a multi-AP system in accordance with an example embodiment.

In a distributed wireless network, such as 802.11 WLANs, the access to the wireless channel is controlled by CSMA/CA, and it is difficult to predict the exact transmission times. Similarly, transmission failures and re-transmissions make it difficult to maintain the order of transmission. Due to this, for Joint Transmissions, it may be advantageous to de-couple the data distribution phase and the joint transmission phase.

As shown in FIG. 4, Joint Transmission occurs in two phases: Distribution of Joint Transmission data to Slave APs and Joint Transmission to one or more Target STAs. In the first phase, one or more Joint Transmission Data are distributed to Slave APs (e.g., over a wireless backhaul). Each Joint Transmission Data is assigned a unique ID. In the second phase, the Master AP initiates the Joint Transmission by transmitting the JT Trigger frame. This frame carries the Unique ID that identifies the Joint Transmission Data to be jointly transmitted by all participating APs.

FIG. 4 shows an example message sequence involved in a joint transmission in which the data distribution phase 410 is de-coupled from the joint transmission phase 420. During the data distribution phase 410, the Master AP distributes one or more Joint Transmission (JT) Data to the Slave APs. The JT Data in this case may be the actual S-MPDU or A-MPDU to be jointly transmitted and is encapsulated in another Data frame addressed to the Slave APs. To reduce the overhead of distributing the JT Data, the encapsulating Data frame may be transmitted to Slave APs as groupcast transmission instead of unicast transmissions. The Master AP may also use Multi-user (MU) PPDU format to simultaneously distribute different JT Data to different Slave APs.

In order to uniquely identify each JT Data, the Master AP also assigns a unique ID which may be called a JT Packet ID, to each JT Data. Each Slave AP, upon receiving the encapsulated JT Data, de-encapsulates and saves the JT Data in local memory indexed by the JT Packet ID. To ensure that the Slave AP saves the JT Data instead of forwarding it immediately to the Target STA, the data frame that encapsulates the JT Data can be addressed to the Slave AP by setting the RA to the MAC address of the Slave AP. If the four-address MAC Header is used for the Data frame to Slave APs, both the RA (Address 1) and DA (Address 3) can be set to the Slave AP's MAC address. Due to the stringent time synchronization requirement for Joint Transmission and for faster retrieval, the JT Data frame may be saved in a separate memory (e.g., different from the local EDCA queues).

In the Joint Transmission phase 420, the Master AP initiates the Joint transmission by transmitting the JT Trigger frame to the Slave APs. The JT Trigger frames provide time synchronization to the Slave APs. In addition, the JT Trigger frame also carries the JT Packet ID of the JT Data to be jointly transmitted. Each Slave AP, upon receiving the JT Trigger frame, retrieves the JT Data from local memory corresponding to the JT Packet ID and transmits the JT PPDU constructed from the JT Data.

Figure 5A:
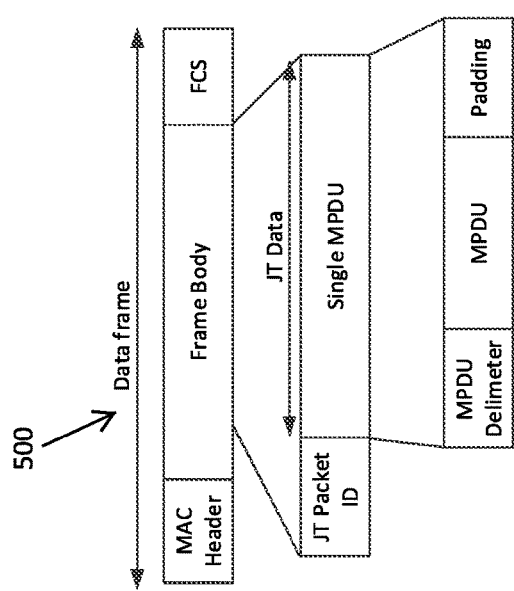
FIGS. 5A and 5B are Data frames used to encapsulate JT Data in accordance with an example embodiment.
Figure 5B:
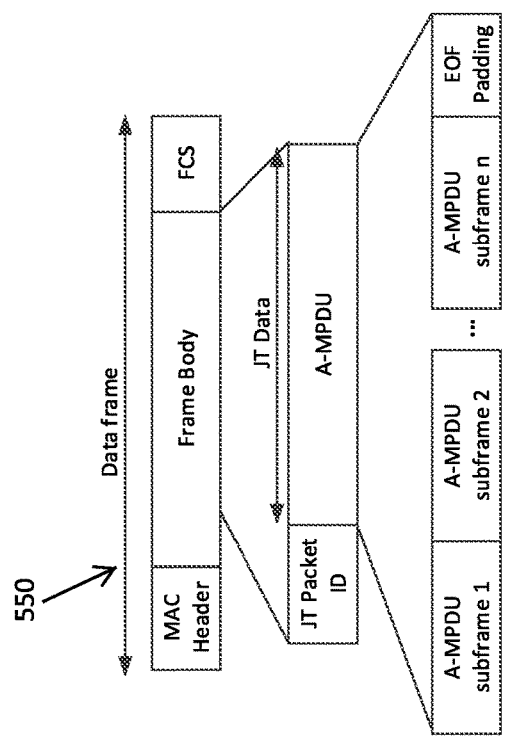

FIGS. 5A and 5B are Data frames used to encapsulates JT Data in accordance with an example embodiment.

FIG. 5A shows a Data frame 500 transmitted by the Master AP that encapsulates JT Data, which in this case is an S-MPDU, within the frame body of the data frame 500. The S-MPDU is composed of a MPDU Delimiter, the actual MPDU and padding if required. A unique ID (JT Packet ID) is assigned to each Joint Transmission Data. In this case, the JT Packet ID uniquely identifies the S-MPDU.

FIG. 5B shows a Data frame 550 transmitted by the Master AP that encapsulates JT Data, which in case is an A-MPDU, within the frame body of the data frame 550. The A-MPDU is composed of two or more A-MPDU subframes, and EOF (End-of-frame) padding if required. Each A-MPDU subframe shares the same format as an S-MPDU. In this case, the JT Packet ID uniquely identifies the A-MPDU.

If encryption is enabled, each of the MPDUs in the JT Data is also encrypted by the Master AP before encapsulating in the Data frame 500 or 550.

Each Slave AP, upon receiving the encapsulated JT Data, de-encapsulates and saves the JT Data in local memory indexed by the JT Packet ID. Due to the stringent time synchronization requirement for Joint Transmission, for faster retrieval the JT Data frame may be saved in a separate memory (e.g., different from the local EDCA queues).

The Slave APs do not immediately forward the received JT Data to the Target STA(s). To ensure this, if the four-address MAC Header is used for the Data frame to Slave APs, both the RA (Address 1) and DA (Address 3) are set to the Slave AP's MAC address.

Figure 6:
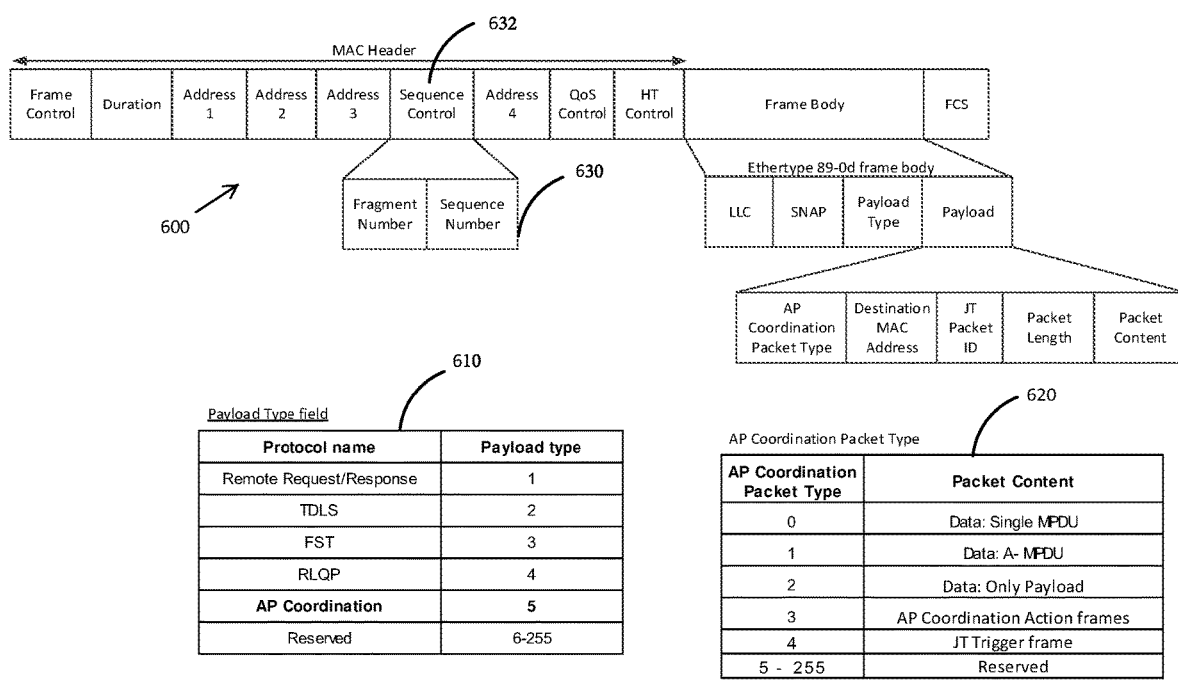
FIG. 6 shows a data frame, a first table showing protocol names and payload types, and a second table showing AP coordination packet type in accordance with an example embodiment.

FIG. 6 shows a data frame 600, a first table 610 showing encoding of the payload type field, and a second table 620 showing encoding of the AP coordination packet type field in accordance with an example embodiment.

The Data frame 600 encapsulates JT Data during the Data distribution phase (e.g., discussed at 410 in FIG. 4). In this example, the frame body of the data frame 600 carries an Ethertype 89-0 d frame with the Payload Type field set to 5 "AP Coordination" to differentiate from other encapsulation types. Ethertype 89-0 d is the Ethertype originally assigned for encapsulation of IEEE 802.11 frames within Ethernet frames. The Payload of the Ethertype 89-0 d frame when the Payload Type is set to "AP Coordination" may carry the JT Data within the Packet Content field when the AP Coordination Packet Type field is set to 0, 1 or 2 as indicated in Table 620. The Destination MAC Address carries the MAC Address of the Target STA (e.g., target of the Joint Transmission). The JT Packet ID is the unique ID assigned to the JT Data while the Packet Length field indicates the size of the JT Data carried in the Packet Content field. When 802.11 Data frames are exclusively used to encapsulate the JT Data, the Sequence Number subfield 630 in the Sequence Control field 632 of the host 802.11 data frame may be used as an implicit JT Packet ID, and the JT Packet ID field may be omitted in the Ethertype 89-0 d frame body.

To ensure that the Slave APs save the JT Data instead of forwarding it immediately to the Target STA, the data frame 600 that encapsulates the JT Data is addressed to the Slave AP by setting the RA field of the MAC Header to the MAC address of the Slave AP. If the four-address MAC Header is used, both the RA (Address 1) and DA (Address 3) are set to the Slave AP's MAC address.

Figure 7:
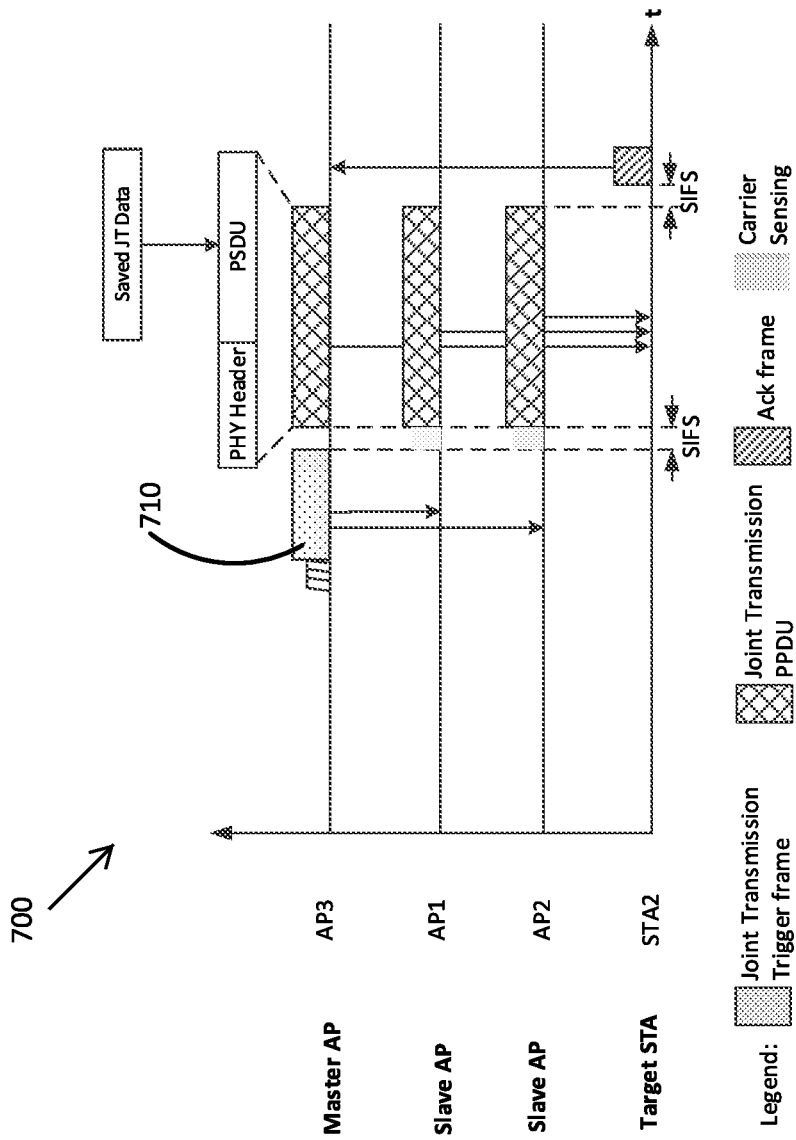
FIG. 7 shows joint transmission between a Master AP, Slave APs, and a Target STA in accordance with an example embodiment.

FIG. 7 shows joint transmission 700 between a Master AP, Slave APs, and a Target STA in accordance with an example embodiment.

In the Joint Transmission phase (e.g., discussed at 420 in FIG. 4), the Master AP initiates the Joint transmission by transmitting the JT Trigger frame 710 to the Slave APs. In addition to PHY and MAC parameters used for synchronization, the JT Trigger frame also carries the JT Packet ID of the JT Data to be jointly transmitted. Each Slave AP's MAC layer, upon receiving the JT Trigger frame that identifies the Slave AP as a participating AP in the joint transmission, retrieves the JT Data from local memory corresponding to the JT Packet ID and passes down to the PHY layer which constructs the JT PPDU from the JT Data before transmitting its SIFS (Short Interframe Space) after the end of the JT Trigger frame. The Master AP too constructs the JT PPDU from the JT Data corresponding to the JT Packet ID and transmits the JT PPDU SIFS (Short Interframe Space) after the end of the JT Trigger frame. Since the channel states may be different at different APs, each Slave APs may need to consider the channel condition and transmit the JT PPDU only if the channel is considered idle during the SIFS after the end of the JT Trigger frame, except that NAV (Network Allocation Vector) set due to Master AP's or Target STA's transmissions may be ignored. As for the Target STA, upon receiving the JT Data, it may not even be aware that multiple APs were involved in the transmission. As far as the Target STA is concerned, this is just another transmission to it from the Master AP, or the AP whose MAC Address appears in the TA address (Address 2) field of the frame. If the reception is successful, the Target STA proceeds to transmit the acknowledgement frame (ACK or Block Ack) to the AP whose MAC Address appears in the TA address (Address 2) field.

Figure 8:
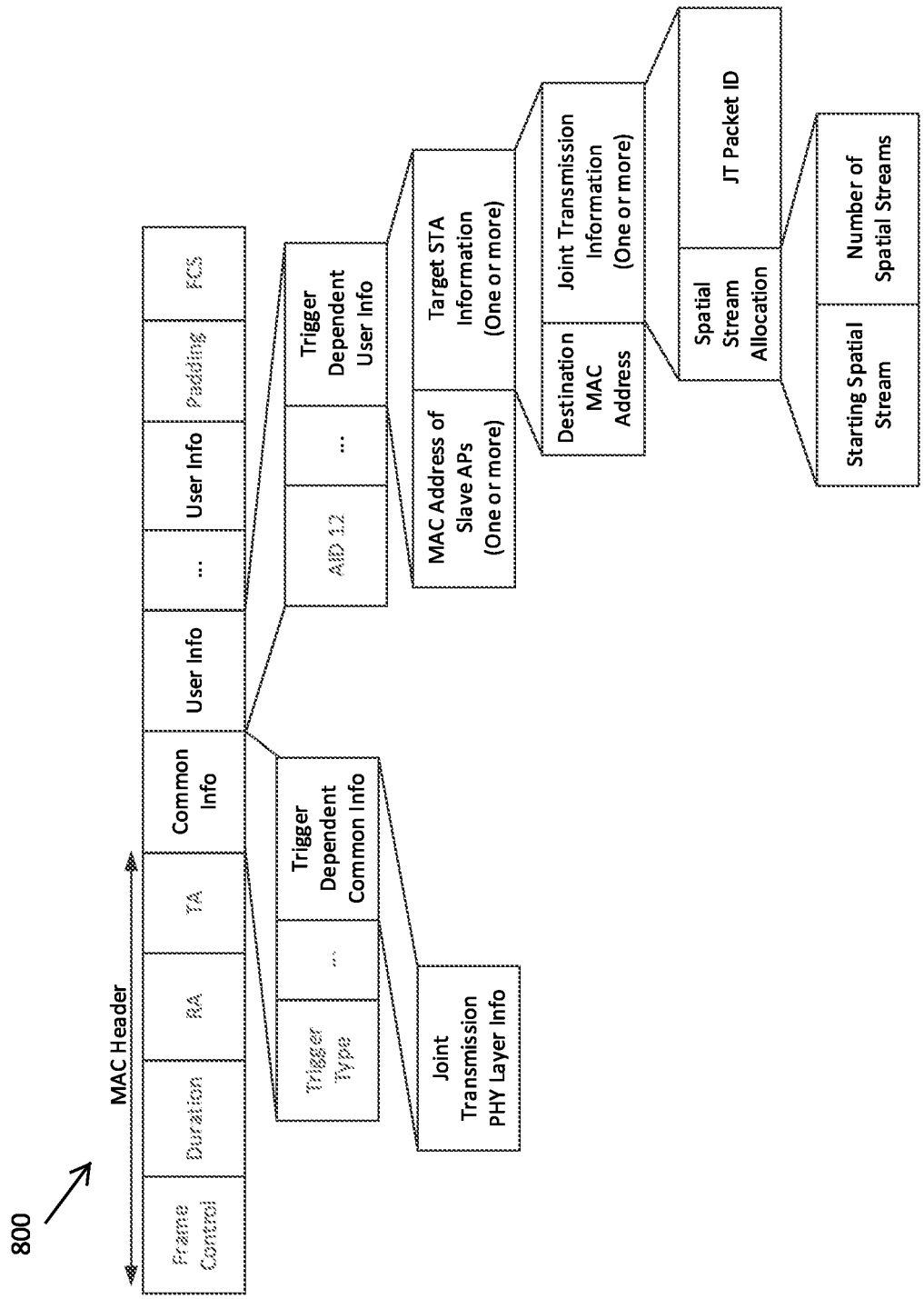
FIG. 8 is a JT Trigger frame in accordance with an example embodiment.

FIG. 8 is a JT Trigger frame 800 in accordance with an example embodiment. Each User Info field carries information of a set of Slave APs and Target STAs.

The MAC Address of Slave APs field identifies the Slave APs participating in the Joint Transmission for a particular set of STAs. If only a single Slave AP is involved in the Joint Transmission, this may be omitted and the Slave AP is identified by the RA field in the MAC header. The AID12 field within each user Info field may be set to a special value (e.g. 2047) to differentiate the JT Trigger frame from the other Trigger frames used to solicit uplink OFDMA transmissions.

The JT Packet ID field identifies the (stored) MPDUs to be carried in the JT PPDU. In case of S-MPDU this may also be the value of the Sequence Control field of the S-MPDU. The field value may be same for different Slave APs if identical data is to be jointly transmitted (transmit diversity). Alternatively, the field value may be different for different Slave APs when different data are to be jointly transmitted (D-MIMO).

In addition, the Joint Transmission PHY Layer Info field specifies the additional PHY parameters to be used for encoding of the JT PPDU. For example, for transmit diversity join transmissions (also known as non-coherent joint transmissions) in order to prevent unintentional beamforming, it is desirable that different Cyclic Shift Diversity (CSD) values are used for the transmit antenna (transmit chains) of different APs participating in the joint transmission to a Target STA using the same spatial stream. In such cases the Joint Transmission PHY Layer Info field may specify the (CSD) values to be used by the Slave APs for its transmit chains. The Master AP may choose the CSD values to be used for each transmit chain of each Slave AP and informs the exact CSD values to Slave APs.

Alternatively, instead of signaling the exact CSD values, the Master AP assigns index # to the transmit chain involved in the joint transmission and informs the index # to the Slave APs in the Joint Transmission PHY Layer Info field. The Slave APs chose CSI value as per index # by referring to a stored table of CSD values. If a Slave AP transmits using more than one antenna, the index # may be a starting index with the subsequent antenna using the CSD values corresponding to the next index # in the table. The Target STA Information carries information relevant for Joint Transmission to one or more Target STAs by the Slave AP. The Joint Transmission Information identifies the stored data to be transmitted and the spatial stream for the Target STA.

Further, the Spatial Stream Allocation field indicates the spatial streams allocated for each Target STA and is only present in the case of MIMO joint transmissions. The Starting Spatial Stream field indicate the first spatial stream allocated to the STA, while the Number of Spatial Streams field indicate the total number of consecutive spatial streams, including the first spatial stream, allocated to the STA.

Figure 9:
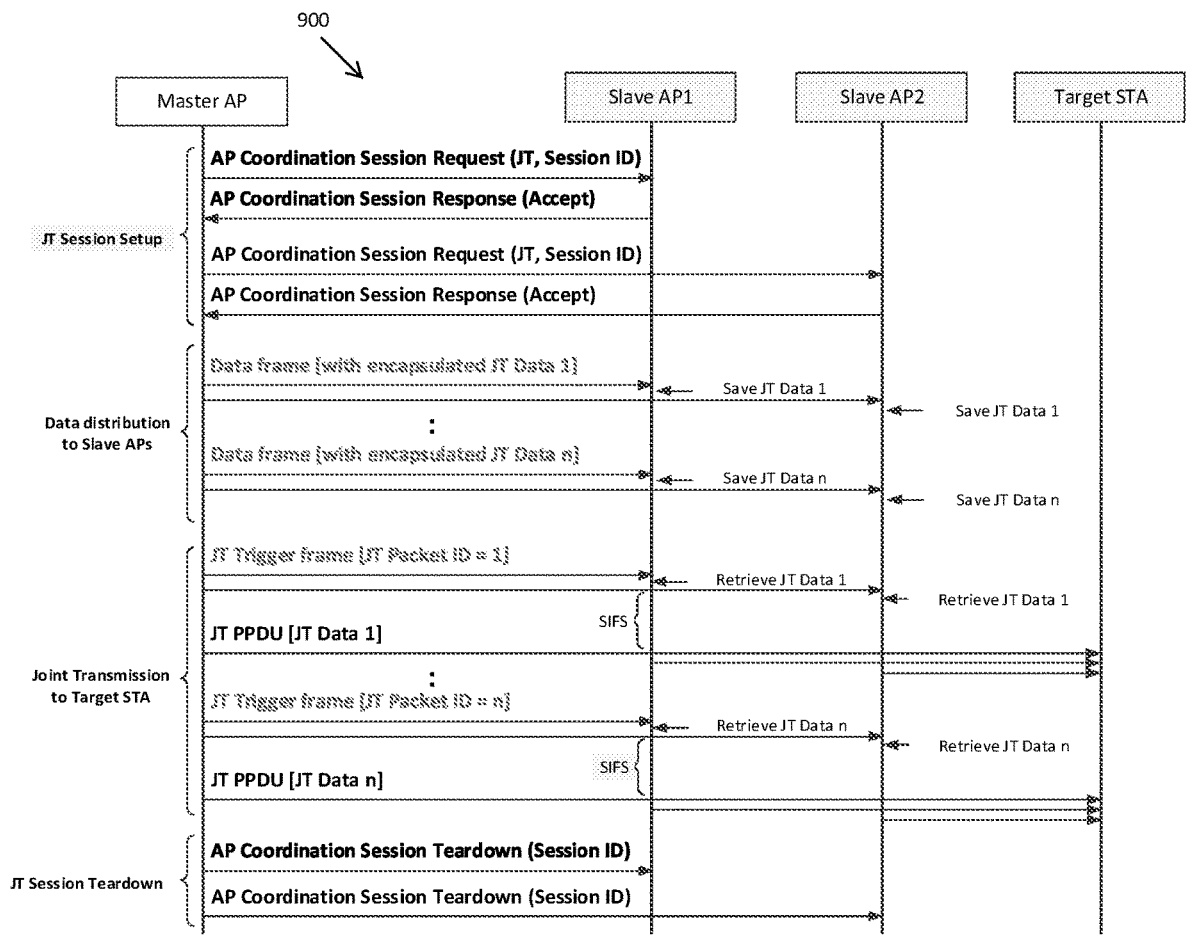
FIG. 9 is a message sequence for a Joint Transmission Session between a Master AP and Slave APs in a multi-AP system in accordance with an example embodiment.

FIG. 9 is a message sequence 900 for a Joint Transmission Session between a Master AP and Slave APs in a multi-AP system in accordance with an example embodiment.

If the joint transmission is expected to take place for more than one or two frames, an example embodiment sets up a joint transmission session between the Master AP and the participating Slave APs prior to the actual joint transmission. During the joint transmission session negotiation, the Master AP and Slave APs exchange information about the Target STAs involved in the joint transmission. The Master AP and Slave APs also specify the joint transmission parameters that are expected to be used throughout the session, for example the channel to be used, the PPDU format (HT, VHT or HE etc.), pre-coding schemes for MU-MIMO etc. Each joint transmission session is identified by a unique Session ID. The Master AP initiates the setup of a joint transmission session by transmitting an AP Coordination Session Request frame to a Slave AP. If the Slave AP accepts the request, it transmits back an AP Coordination Session Response frame, with the Status code field set to Accept, to the Master AP. The Master AP repeats the process for each Slave AP participating in the joint transmission. To terminate a session, the Master AP transmits the AP Coordination Session Teardown frame to a Slave AP.

Figure 10:
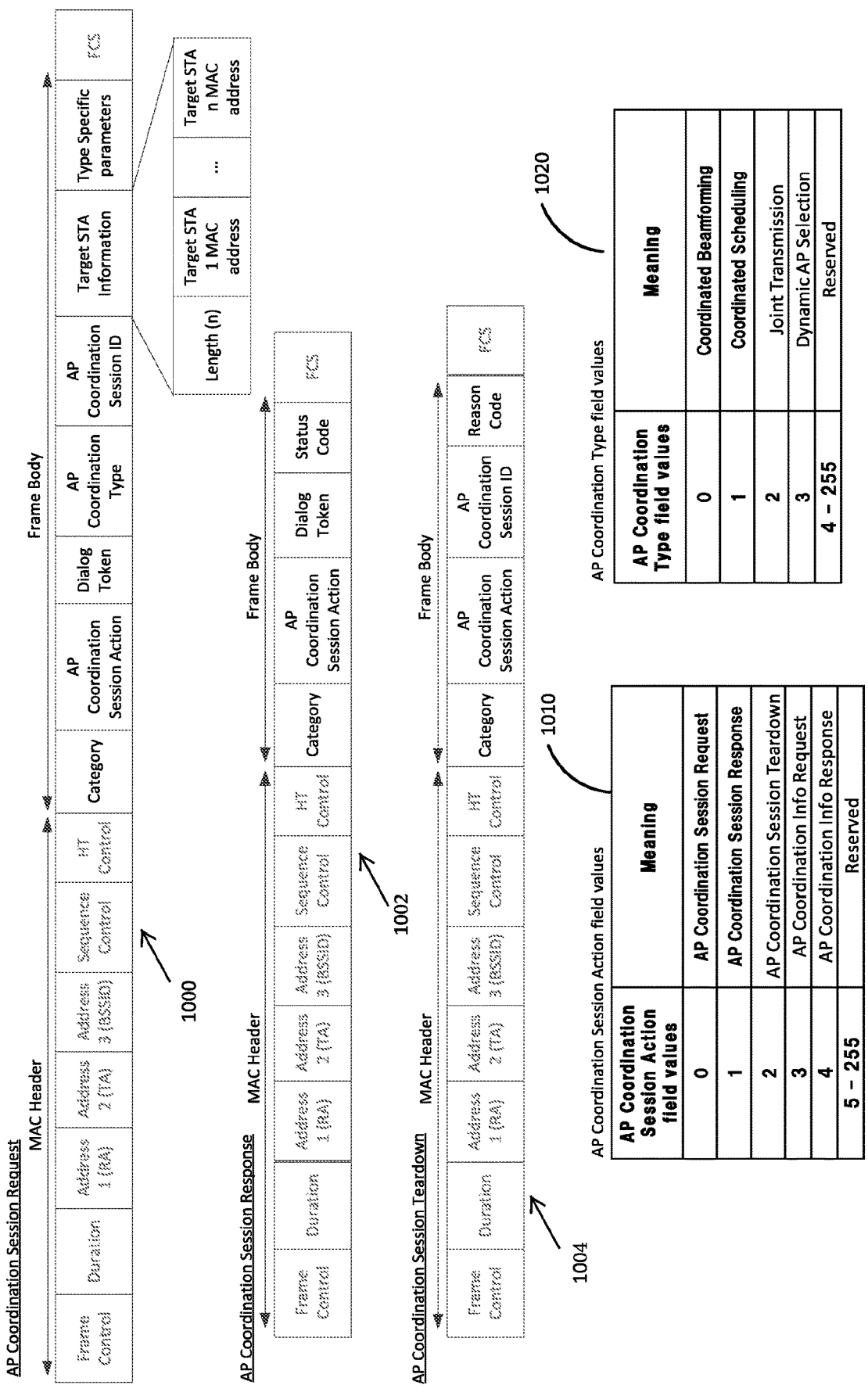
FIG. 10 shows AP Coordination Action frames exchanged over the air to negotiate or tear down a Joint Transmission Session in accordance with an example embodiment.

FIG. 10 shows AP Coordination Action frames exchanged between the AP to negotiate or to teardown joint transmission sessions in accordance with an example embodiment. The figure shows an AP Coordination Session Request 1000, an AP Coordination Session Response 1002, an AP Coordination Session Teardown 1004, a table 1010 with AP Coordination Session Action field values, and a table 1020 with AP Coordination Type field values.

A new category of Action frames is defined for Multi-AP Coordination and indicated in the category field. Five new Action frames are defined for the purpose of AP to AP communication related to Multi-AP Coordination, out of which three are used for setup/teardown of sessions (indicated by the value of the "AP Coordination Session Action" field as listed in table 1010). Sessions may be setup for various types of multi-AP coordination schemes and is indicated by the value of the "AP Coordination Type" field in the AP Coordination Session Request frame as listed in table 1020. For example, for joint transmission sessions, it is set to 2. The "Target STA information" field in the AP Coordination Session Request frame 1000 lists the MAC Addresses of one or more Target STAs that are expected to participate in the joint transmission.

The "Type Specific parameters" field in the AP Coordination Session Request frame 1000 carries additional session parameters that are specific to the AP Coordination Type. For example, for Joint Transmission, the field may specify the Channel information for the joint transmission. The channel information may be present when the Master AP and Slave APs are operating on different fronthaul channels. The "Type Specific parameters" field may also indicate the start time at which the joint transmission is expected to start. In dense networks it is common for neighboring APs to operate on different channels to mitigate inter-BSS interference. If the channel specified in the Channel information is different from a Slave AP's operating channel and if the Slave AP accepts the AP Coordination session request, the Slave AP is expected to switch channel to the specified joint transmission channel before the indicated joint transmission start time.

As another example, for Joint Transmission, if encryption is enabled for joint transmission, and encryption is to be performed locally at each AP, the "Type Specific parameters" field may also include the security key (e.g. PTK) to be used for the encryption.

As yet another example, for Joint Transmission, the "Type Specific parameters" field may also include the amount of buffer space requested by Master AP to be allocated by Slave APs to save JT Data frames.

Figure 11:
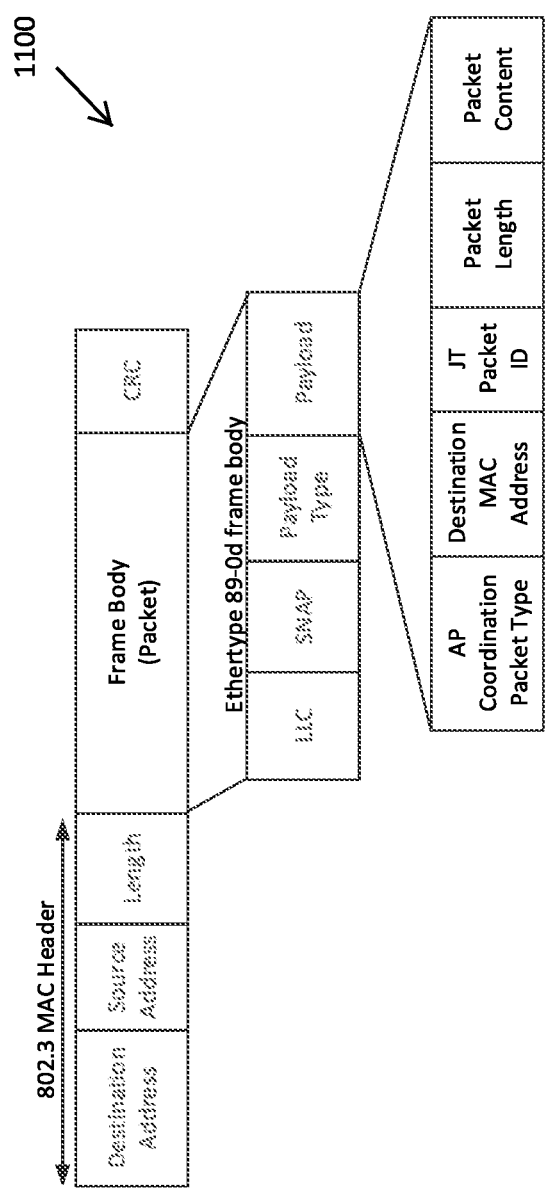
FIG. 11 shows a frame in which an Ethernet Frame encapsulates JT Data as well AP Coordination Action frames in accordance with an example embodiment.

FIG. 11 shows a frame 1100 in which an Ethernet Frame encapsulates JT Data as well AP Coordination Action frames in accordance with an example embodiment.

The Master AP encapsulates the Joint Transmission Data frame (entire S-MPDU or A-MPDU carrying the Joint Transmission Data payload) within an 802.3 (Ethernet) frame and transmits to the slave APs over the Ethernet link. If encryption is to be used, the encrypted frame/s are encapsulated.

When Ethernet frames are used to exchange AP Coordination information between APs, Ethertype 89-0d frames may also be used to encapsulate the AP Coordination Action frames, for example to setup or teardown a AP Coordination session. In this case, the Payload Type field is set to "AP Coordination" and the Ethertype 89-0 d frame payload carries AP Coordination Action frames. The "AP Coordination Packet Type" field in this case is set to AP Coordination Action frames (set to 3 as indicated in Table 620 in FIG. 6) and the Packet Content field carries the AP Coordination Action frames, while the other fields in the payload are omitted.

The Destination Address in the MAC Header ensures that Slave APs do not forward the received JT Data frames to Target STAs immediately. For example, the sub-field is set to the Slave AP's MAC address and not to the Target STA's MAC address.

The transmissions to different Slave APs may not be synchronized in time in wired or mixed backhaul scenario and may happen at the same time or at different times. The JT Packet ID is used to synchronize the Joint Transmission content.

Figure 12:
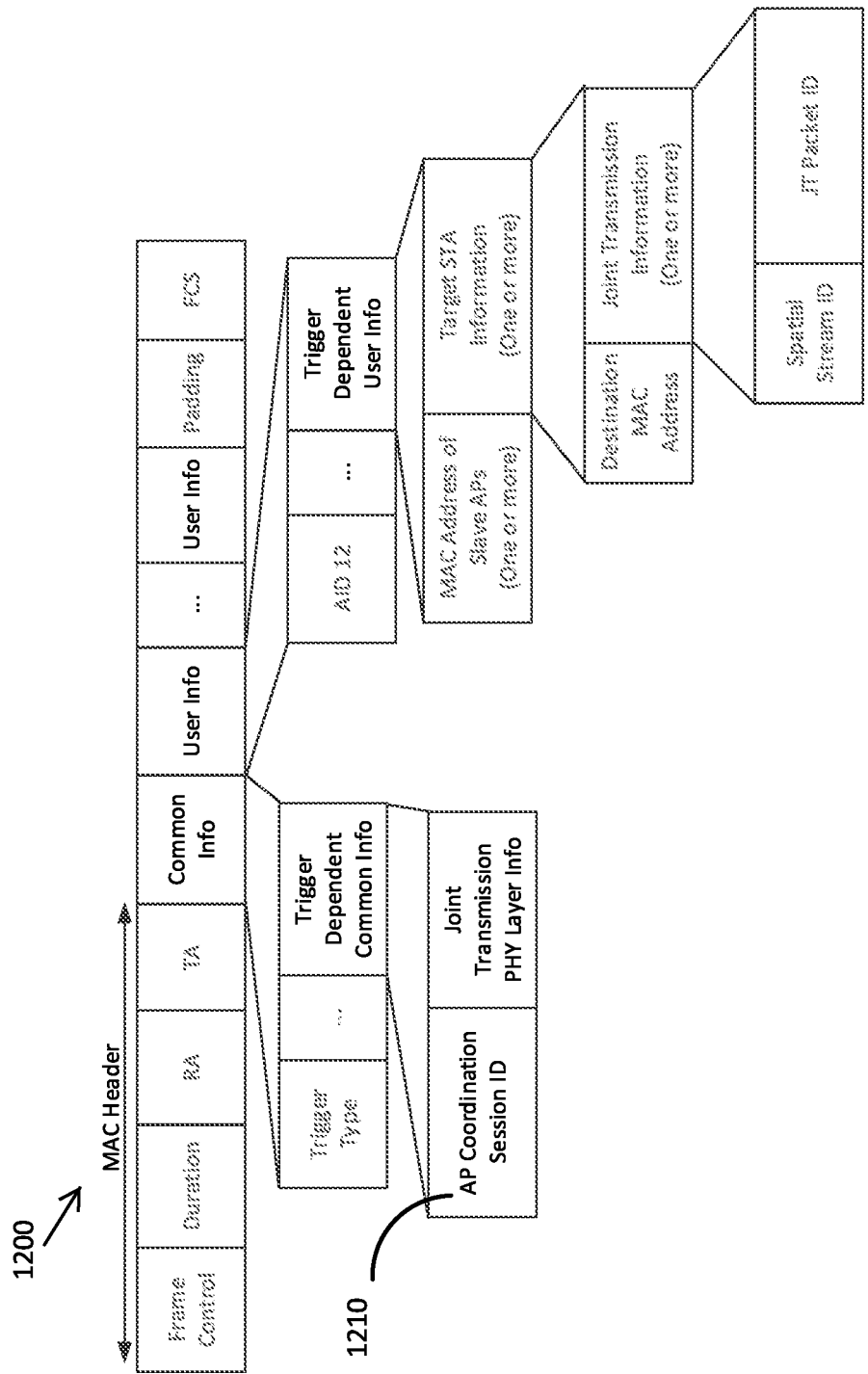
FIG. 12 shows a Trigger frame for Joint Transmission to a Target STA in accordance with an example embodiment.

FIG. 12 shows a Trigger frame 1200 for Joint Transmission to a Target STA in accordance with an example embodiment.

The Joint Transmission Trigger frame 1200 includes the AP Coordination Session ID 1210. The session ID is included in the JT Trigger frame to indicate which joint transmission session is being triggered. Based on the session ID, the slave APs receiving the JT Trigger frame retrieves the common parameters that were negotiated during the session setup. Such pre-negotiated parameters are omitted in the JT Trigger frame unless the Master AP explicitly overrides any of the parameters. Overhead of joint transmission control signaling over the wireless medium is reduced.

Further, the field MAC Address of Slave APs can be skipped if all Slave APs corresponding to a Session ID are involved in the Joint Transmission. The Destination MAC Address field may also be skipped if the Target STA is obvious from the Session ID.

Figure 13:
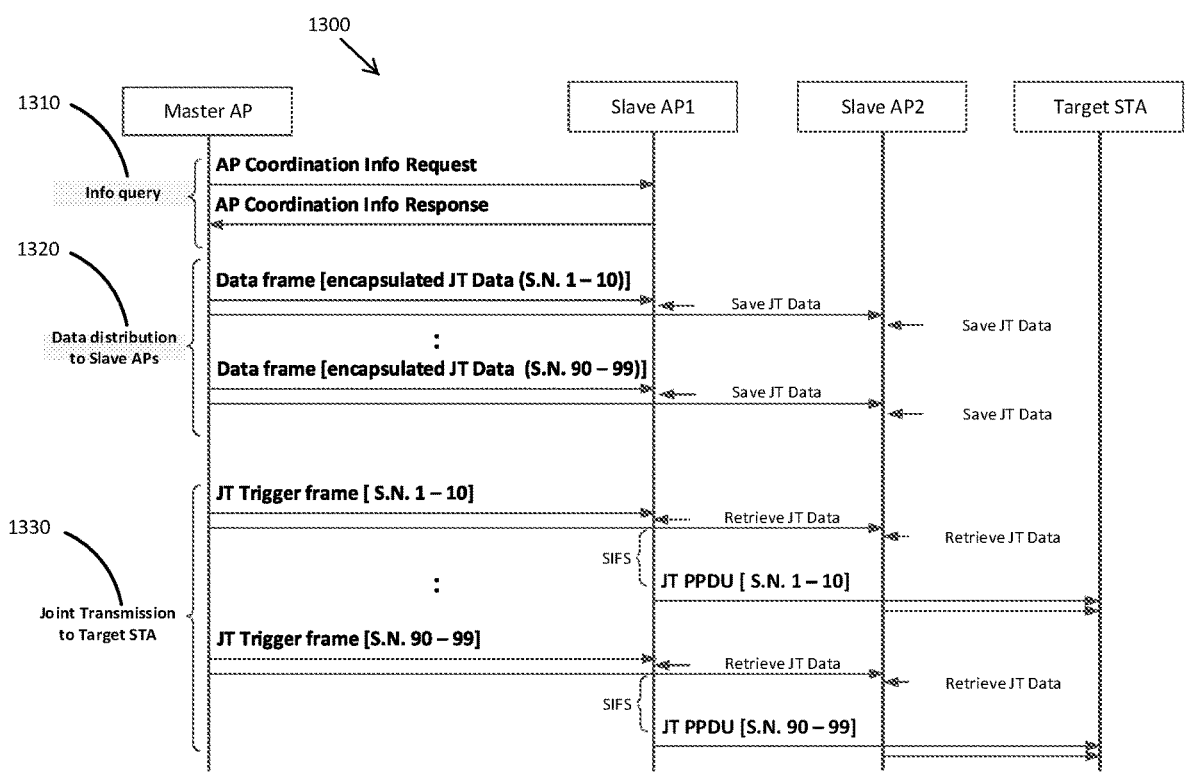
FIG. 13 shows a communication exchange in which the Master AP does not participate in the Joint Transmission in accordance with an example embodiment.

FIG. 13 shows a communication exchange 1300 in which the Master AP does not participate in the Joint Transmission in accordance with an example embodiment.

As mentioned earlier, in some cases, the Master AP may not be involved in the actual joint transmission phase, only the Slave APs may participate in the joint transmission. This may happen when the Master AP is implemented as a central controller and is far from the Target STA, or the Master AP may not even be an actual AP and may be a Multi-AP controller device in the core network. In this case, the Target STA is associated with one of the Slave APs and not the Master AP. Communications between the Slave APs and Master AP, including the JT Trigger frame, may happen over the wired backhaul (e.g. Ethernet). When there is no wireless link between the Master AP and the Slave APs, even the JT Trigger frames are encapsulated within Ethernet frames. Due to the stringent time synchronization requirement for joint transmission and because of the fact that JT Trigger frames are used for time synchronization among the Slave APs, use of the wired backhaul for transmission of JT Trigger frames is possible only when it can be guaranteed that all the participating Slave APs receive the JT Trigger frame at the same time. In this case, the Payload Type field is set to "AP Coordination" and the Ethertype 89-0 d frame payload carries JT Trigger frames. The "AP Coordination Packet Type" field in this case is set to JT Trigger frame (set to 4 as indicated in Table 620 in FIG. 6) and the Packet Content field carries the JT Trigger frame, while the other fields in the payload are omitted. This kind of deployment removes the constraint of requiring the Slave APs to be in wireless range of the Master AP and enables joint transmission on a much larger scale, where a Master AP in a centralized location can remotely manage joint transmission in multiple physical locations. However if it cannot be guaranteed that all the participating Slave APs receive the JT Trigger frame at the same time, the JT Trigger frame is transmitted over the wireless medium.

In such cases where a Target STA is not associated with the Master AP, the Master AP may not know the value to be used for the Sequence Control field, or the CCMP Packet Number (PN) which are locally generated by the Slave AP. For example if the Target STA is associated with Slave AP1, prior to the data distribution phase 1320, the Master AP initiates the Info query phase 1310 and queries the Slave AP1 for the next Sequence Control to be used, and optionally the CCMP Packet Number (PN) and encryption Key ID to be used for transmission to the Target STA. The Master AP uses the queried information to set the respective fields of the encapsulated JT Data if entire MPDUs are distributed to the Slave APs, or the information is distributed to the Slave APs if MPDUs for joint transmission are locally generated by the Slave APs.

At some point prior to the data distribution phase 1320, the Master AP also makes arrangements for the upper layer data to be routed through itself instead of through the Slave AP1. This may be done by temporarily updating the routing table of the network router device forwarding the data payload to the APs such that the Master AP is recorded as the serving AP for the Target STA.

During the data distribution phase 1320, the Master AP sets the MAC header fields of the encapsulated JT Data such that the data appears to be generated by the Slave AP1 with which the Target STA is associated, e.g. the Address 2 (TA) field of the jointly transmitted MPDUs is set to the MAC address of the Slave AP1. Also, the sequence number subfield in the sequence control field of the MPDUs (of the JT Data) are used as implicit JT Identifiers, so explicit JT Packet IDs are not assigned to the JT Data. During the Joint Transmission phase 1330, the Master AP still initiates a joint transmission by transmitting the JT Trigger frame, however only the Slave APs participate in the actual joint transmission. For the Target STA, the transmission appears to be initiated by the Slave AP1.

Figure 14:
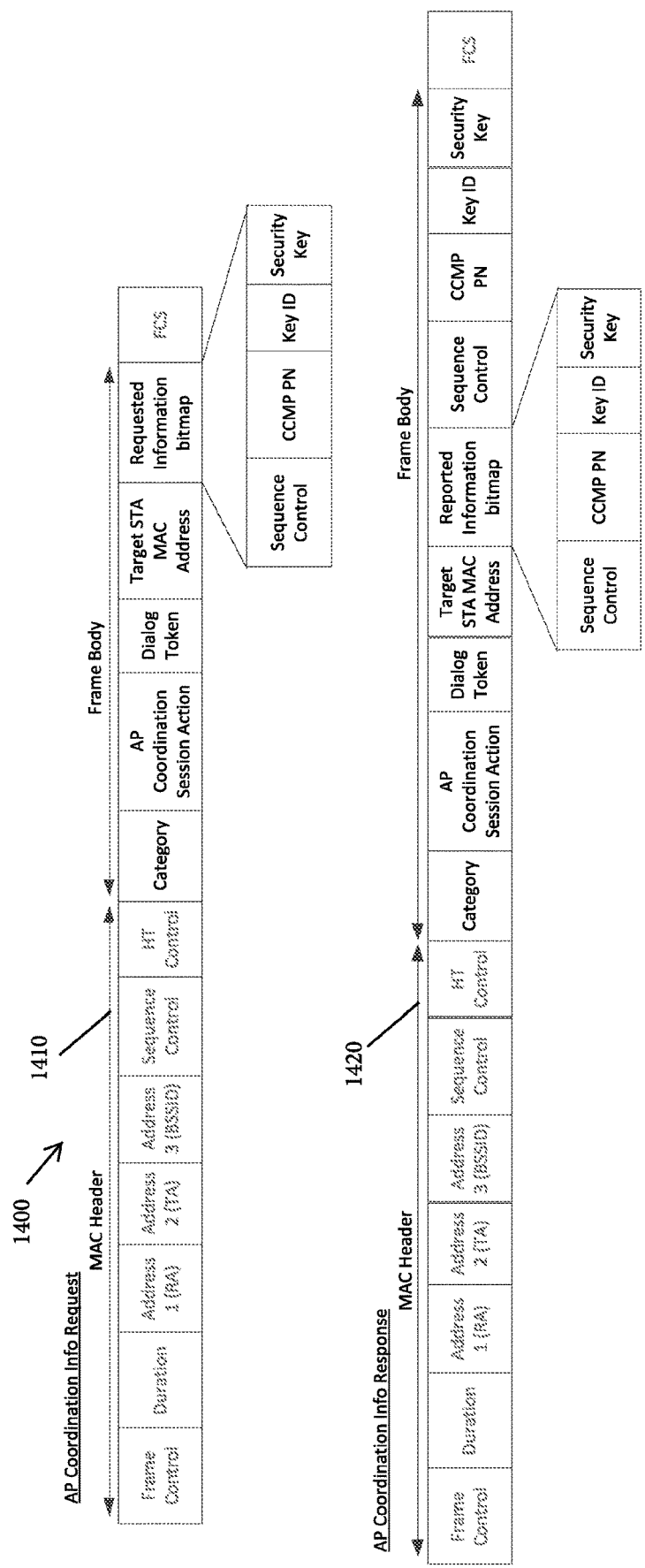
FIG. 14 shows Action Frames used by AP in the information query phase to gather information from another AP in accordance with an example embodiment.

FIG. 14 shows Action Frames 1400 used by AP in the information query phase to gather information from another AP in accordance with an example embodiment.

The AP Coordination Info Request frame includes the Requested Information bitmap that indicates the information about the Slave APs parameters for a Target STA that are solicited by the Master AP. The Slave AP uses the AP Coordination Info Response frame to report the solicited information to the Master AP, the included information being indicated by the Reported Information bitmap Although the Master AP can initiate the request, it is also possible for Slave APs to initiate the request. The AP Coordination Info Request frame 1410 includes the Requested Information bitmap that indicates the information about the receiving AP's parameters for a Target STA that are solicited by the transmitting AP. The recipient AP uses the AP Coordination Info Response frame 1420 to report the solicited information to the soliciting AP, the included information fields being indicated by the Reported Information bitmap. If a bit is set to 1 in the Reported Information bitmap, the corresponding field is included in the AP Coordination Info Response frame 1420, otherwise it is not present.

Figure 15:
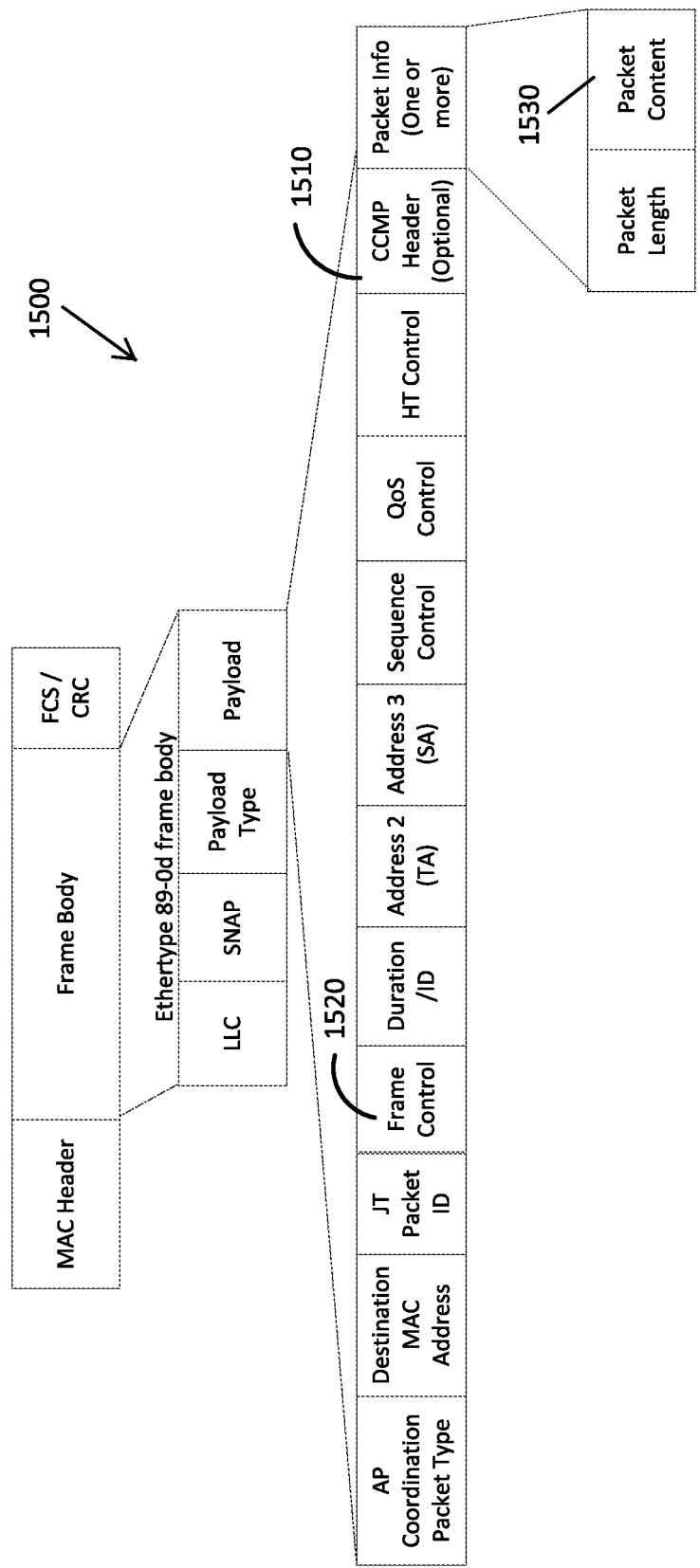
FIG. 15 shows a frame for data sharing from the Master AP to Slave APs in accordance with an example embodiment.

FIG. 15 shows a frame 1500 for data sharing from the Master AP to Slave APs in accordance with an example embodiment.

Instead of encapsulating the whole MAC layer frame (MPDU or A-MPDU), Master AP only encapsulates the upper layer data payload (also known as MSDU (MAC Service Data Unit)), and the other relevant fields of the MAC header within the Payload field of the Ethertype 89-0 d frame body. If multiple data payloads are included, the sequence control field, and the CCMP header (if included) carry the starting Sequence Number (SN) and Packet Number (PN) respectively. Based on this, each Slave AP generates the MPDUs or A-MPDUs to be jointly transmitted. If required, encryption of data is performed by each Slave AP.

Copies of the Frame control, Duration/ID, QoS Control and HT Control fields are used by Slave APs to create MAC Headers for the locally generated MPDUs. Alternatively, some or all of these fields may also be distributed during JT Session setup if these fields remain the same throughout the JT session.

The CCMP Header field 1510 is present if the "Protected Frame" bit in the Frame Control field 1520 is set. The CCMP Header field 1510 carries the Packet Number (PN) to be used to encrypt the first MPDU with the subsequent MPDUs using sequentially increasing PN.

The Sequence Control field 1520 carries the Sequence Number (SN) to be used for locally created A-MPDUs. This is used as the starting SN for the first MPDU and increases sequentially for subsequent MPDUs in the A-MPDU.

The Packet Content field 1530 only carries higher layer payload (also known as MSDU). Each of the Slave APs append the locally generated MAC headers to the higher layer payload to generate the MPDUs for joint transmission.

Figure 16:
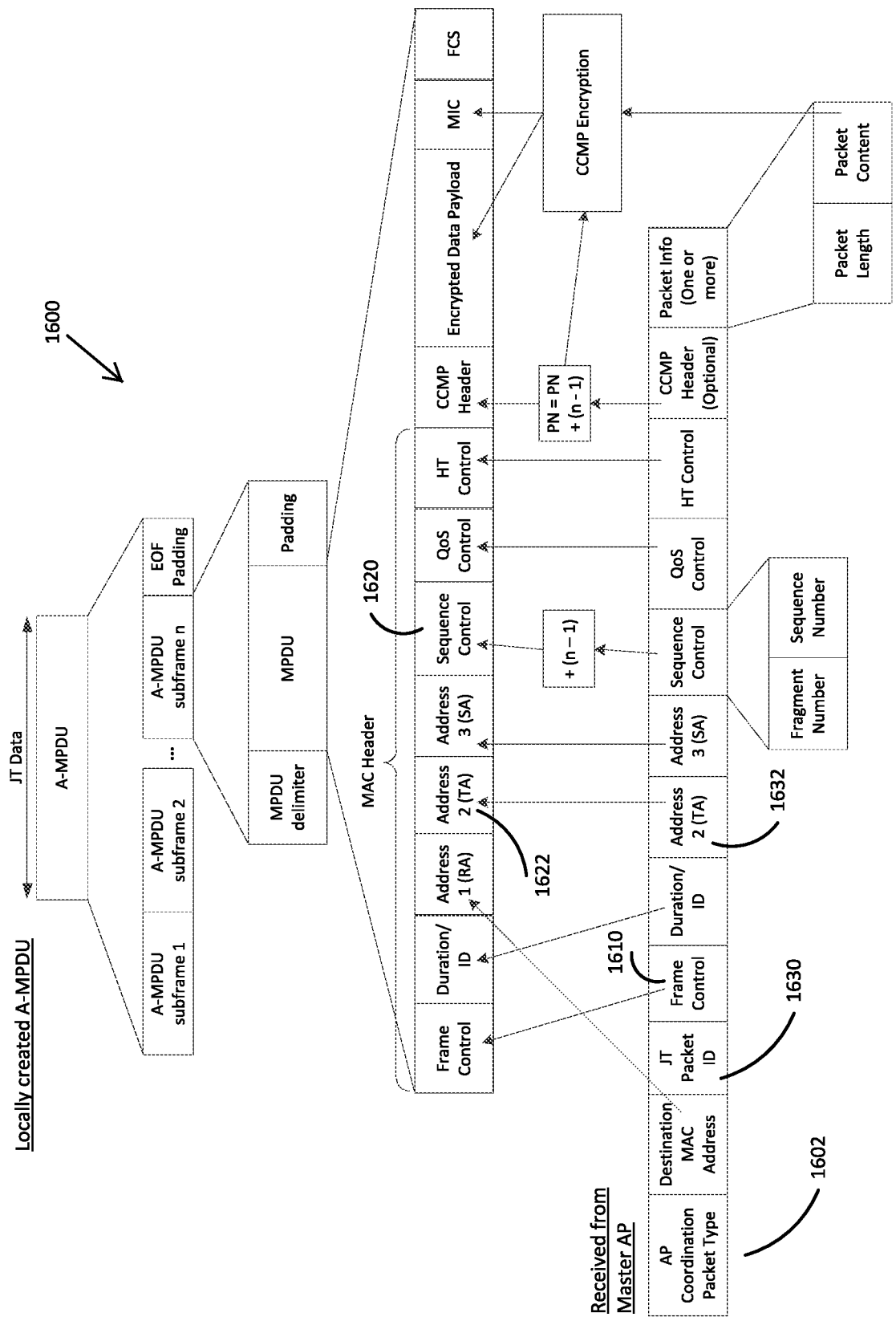
FIG. 16 shows a JT Data frame as an Aggregated MAC Protocol Data Unit (A-MPDU) in accordance with an example embodiment.

FIG. 16 shows a JT Data frame 1600 as an Aggregated MAC Protocol Data Unit (A-MPDU) in accordance with an example embodiment.

Each Slave AP generates the Joint Transmission Data frame 1600 locally and saves it in memory. For example, each Slave AP generates the MPDUs or A-MPDUs to be jointly transmitted based on the information 1602 received from the Master AP. Arrows in FIG. 16 means fields are simply copied over to the locally generated MPDUs, except some field that require additions. The first generated MPDU directly uses the Sequence Control field received from the Master AP, while each subsequent MPDU will increment the sequence number subfield within the Sequence control field 1620 by one. The MPDUs, or A-MPDUs may be generated right upon reception of the encapsulated data from the Master AP and saved in memory. If encryption is required (indicated by the "Protected Frame" bit in the Frame Control field 1610), each Slave AP also encrypts the data payload and generates and appends the MIC to the payload. The first encrypted MPDU directly uses the CCMP Header field received from the Master AP, while each subsequent MPDU will increment the PN subfield within the CCMP Header field by one. The encrypted MPDUs are saved in memory, indexed by the JT Packet ID 1630.

Alternatively, if the Slave APs have fast enough processors, during the data distribution phase, the received MAC parameters and payloads are saved in memory and the MPDU generation (and encryption if required) may be done only after JT Trigger frame is received.

In FIG. 16, the Address 2 (TA) field 1622 in the MPDUs of the locally created JT Data frame 1600 is also copied from the corresponding Address 2 (TA) field 1630 in the information 1602 received from the Master AP. The Address 2 (TA) field 1630 either set to the Master AP's MAC address or to one of the Slave APs MAC Address depending on the AP with which the Target STA is associated. The rest of the fields of each A-MPDU subframe (MPDU delimiter, Padding, FCS, etc.) as well as the EOF padding are locally generated. Further, in the CCMP Encryption frame, the CCMP encryption is performed by the Slave AP if the "Protected Frame" bit in the Frame Control field 1610 is set.

One benefit of the frame 1600 is that the overhead of data transfer over the backhaul is reduced.

Figure 17:
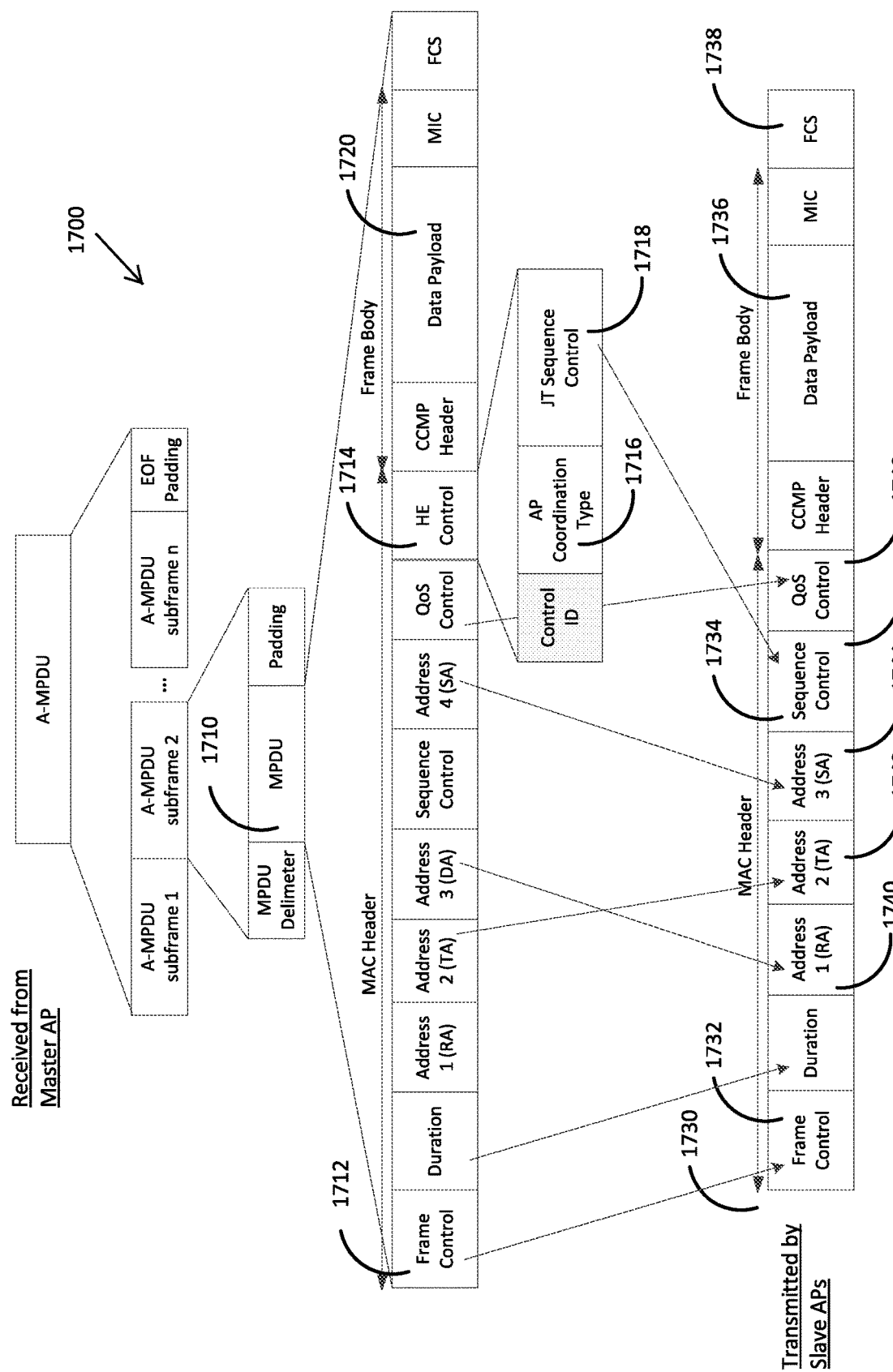
FIG. 17 shows a frame as an Aggregated MAC Protocol Data Unit (A-MPDU) used for data sharing to Slave APs in accordance with an example embodiment.

FIG. 17 shows a frame 1700 as an Aggregated MAC Protocol Data Unit (A-MPDU) used for data sharing to Slave APs in accordance with an example embodiment.

The Master AP uses the 802.11 Data frames 1700 with 4 Address MAC Header format to distribute JT Data to Slave APs (without using Ethertype 89-0 d encapsulation). This distribution scheme may be used when the Slave APs are associated with the Master AP, for example in Wi-Fi EasyMesh deployments.

Upon receiving Joint Transmission Data from the Master AP, the Slave AP generates the MPDUs to be jointly transmitted. The Sequence Number within the Sequence Control fields 1734 in the MAC header of the generated MPDUs 1730 are used as implicit JT Identifiers.

Consider an example of deployments where the Target STA is associated with the Master AP and the Master AP also participates in the actual joint transmissions. The Master AP transmit the A-MDPU 1700 to the Slave AP to distribute the JT data. Each Data frame within the MPDUs of the A-MPDU uses the four address MAC Header format and the Frame Body of the MPDU 1710 carries the actual Data payload 1720 (encrypted if required and including the CCMP Header field and the MIC field) to be jointly transmitted. In this case the JT Data refers to the Data payload 1720 (encrypted if required and including the CCMP Header field and the MIC field). Since the final destination of the Data payload 1720 is not the Slave AP, the "To DS" and the "From DS" bits in the Frame Control field 1712 are both set to 1 to differentiate from AP to STA or STA to AP transmissions. The HE Control field 1714 is also enhanced for EHT usage and a new Control ID is defined for AP Coordination. The Control field may be used to carry control signals for various multi-AP Coordination schemes, the AP Coordination Type 1716 indicating the Coordination scheme and may be set to one of the values in Table 1020 in FIG. 10, for example to 2 for Joint Transmission in which case the subsequent field of the HE Control field is used to carry the JT Sequence Control 1718. The JT Sequence Control field 1718 carries the Sequence Control field 1734 of the actual MPDU to be jointly transmitted.

Upon receiving the A-MPDU 1710 from the Master AP that carries the HE Control field 1714 for AP Coordination, the addressed Slave AP (that is indicated by the Address 1 (RA)), instead of forwarding the A-MPDU to the Target STA (indicted by the Address 3 (DA)), generates the MPDUs or A-MPDUs to be jointly transmitted based on the information received from the Master AP. The generated MPDUs 1730 are 802.11 Data frames that use the three address MAC Header format.

In FIG. 17, the arrows signify fields are copied over from the received MPDUs to the generated MPDUs, except that in the generated MPDUs, the "To DS" bit in the Frame Control field 1732 is set to 0 while the "From DS" bit is set to 1. The Sequence Control field 1734 of the generated MPDU is copied over from the JT Sequence Control 1718 received from the Master AP. The Duration field, the Address 2 (TA) field and the QoS Control field are copied without any modification, while the Address 3 (DA) field is copied over to the Address 1 (RA) field and the Address 4 (SA) field is copied over to Address 3 (SA) field in the generated MPDUs. The HE Control field carrying the JT Sequence Control field is omitted in the generated MPDU. The frame body of the generated MPDU is directly copied over from the MPDU 1710 as received from the Master AP (i.e. without any further processing). The FCS field 1738 however is generated locally by the Slave APs. An important aspect to note here if the Data Payload 1720 is encrypted, is that the CCMP encryption is performed for the consumption of the Target STA and hence the MAC header parameters used for the encryption is based on the MAC header fields that are included in the actual MPDU 1730 that are jointly transmitted and not based on the MAC header fields of the MPDU 1710. Specifically, during the CCMP encapsulation procedure, the Master AP uses the Frame Control field 1732, Address 1 (RA) field 1740, Address 2 (TA) field 1742, Address 3 (SA) field 1744, the Sequence Control field 1746 and the QoS Control field 1748 as would be generated by the Slave APs to construct the additional authentication data (AAD) to be used for the CCMP encryption. The Address 4 field is not included in the AAD. The CCMP Header field, the encrypted data payload 1720 and the generated MIC are included in the frame body of MPDU 1710 and are directly copied over to the frame body of MPDU 1730 by the Slave APs without further processing. This significantly reduces the processing overhead related to encryption for Slave APs.

The MPDUs, or A-MPDUs may be generated by the Slave APs right upon reception of the data from the Master AP and saved in memory. The MPDUs are saved in memory indexed by the Sequence Number subfield of the Sequence Control field 1734. Alternatively, if the Slave APs have fast enough processors, during the data distribution phase, the received MPDUs/A-MPDUs are saved in memory without any modification and the MPDU generation (for joint transmission) may be done only after JT Trigger frame is received.

Figure 18:
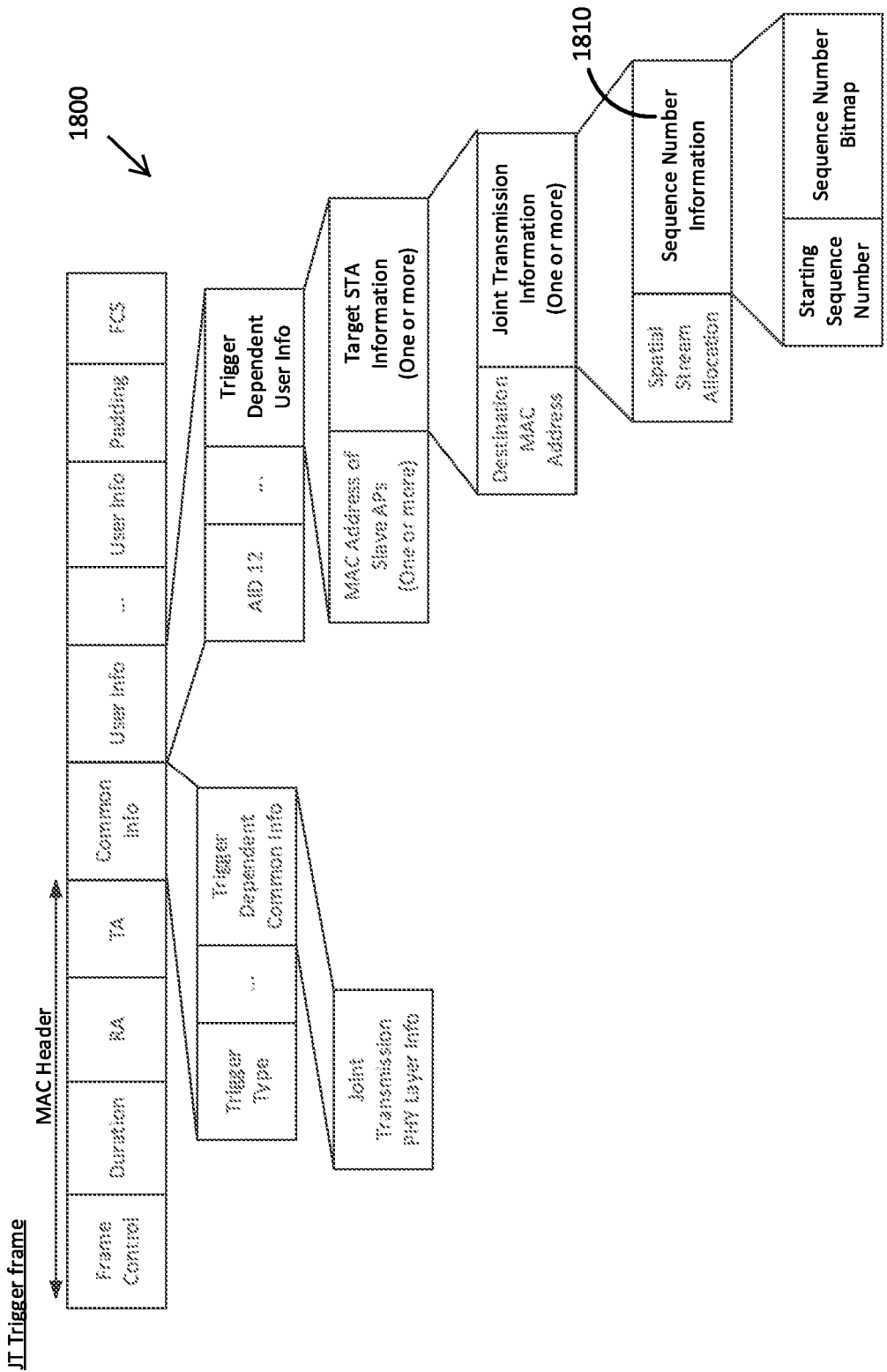
FIG. 18 shows a Joint Transmission Trigger frame in accordance with an example embodiment.

FIG. 18 shows a Joint Transmission Trigger frame 1800 in accordance with an example embodiment.

The JT Trigger frame includes a list of Sequence Number of MPDUs to be jointly transmitted. Slave APs construct the A-MPDU from the saved MPDUs if required.

The sequence number subfield in the sequence control field of the MPDUs (JT Data), for example 1620 in FIG. 16 or 1732 in FIG. 17, are used as implicit JT Identifier. This allows the Master AP more flexibility in choosing the content of the JT Data during the actual joint transmission (by indicating specific sequence numbers in the Sequence Number Information field 1810 in the JT Trigger frame 1800).

This flexibility can be executed, for example, during joint re-transmissions in which only the failed MPDUs are re-transmitted. The Sequence Number Information field 1810 identifies the MPDUs to be jointly transmitted. The bits set to 1 in the Sequence Number Bitmap subfield indicates the sequence number of the MPDUs to be included, with the first bit (n=1) in the bitmap corresponding to the Starting Sequence Number (SSN) subfield and the nth bit corresponding to (SSN+n−1).

Figure 19:
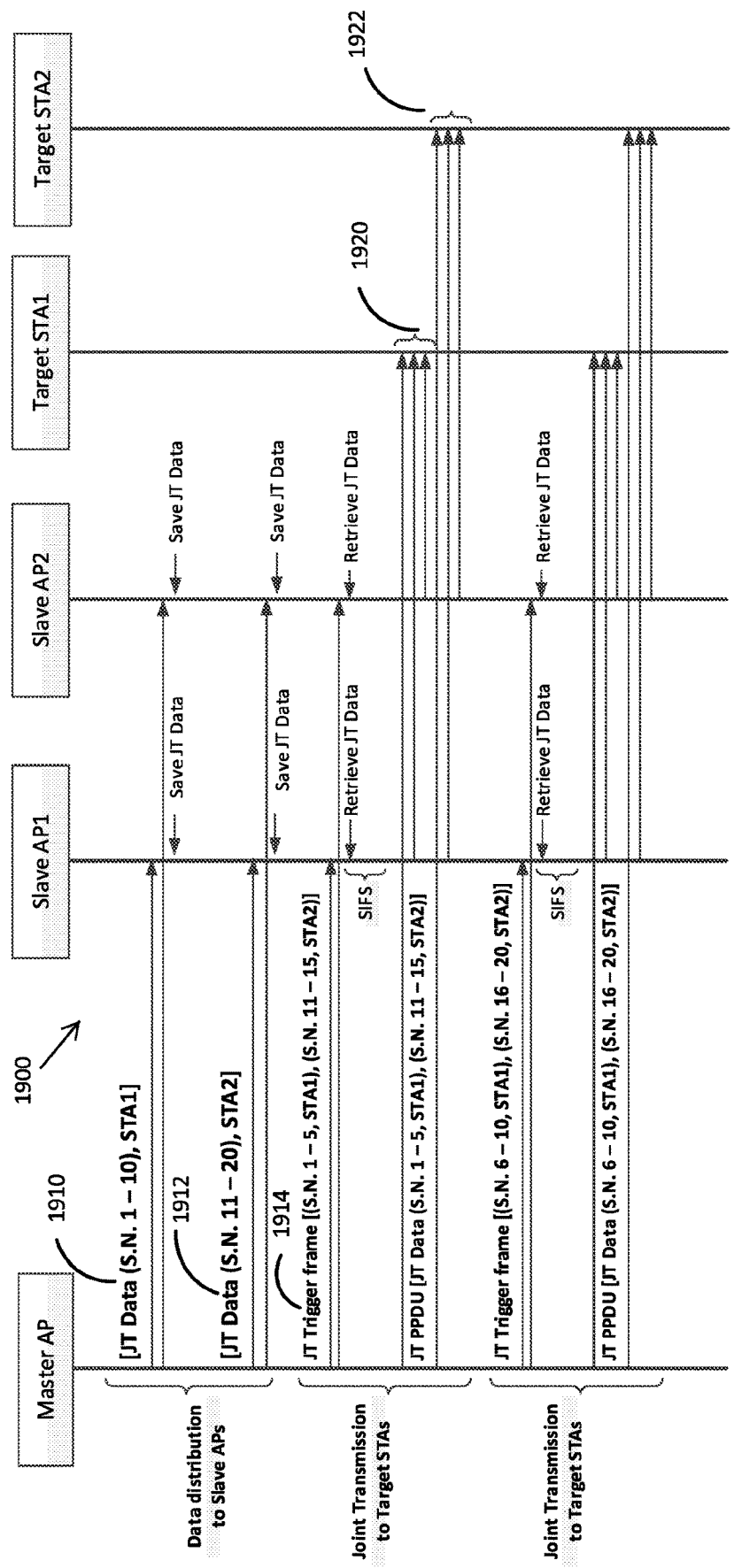
FIG. 19 is example of Distributed MU-MIMO Joint Transmission to two STAs that are both associated with the Master AP in accordance with an example embodiment.

FIG. 19 is example of Distributed MU-MIMO (D-MU-MIMO) Joint Transmission 1900 to two STAs that are both associated with the Master AP in accordance with an example embodiment.

Numbers 1910 and 1912 show data distribution to the Slave APs. JT Data are distributed to Slave APs that are destined for STA1 and STA2 respectively. For example, the JT Data 1910 and 1912 may be A-MPDU 1700 in FIG. 17. Upon receiving the JT Data 1910 and 1920, the Slave APs may generate the MPDUs 1730 for joint transmission by copying over the necessary fields from the received JT Data. The Slave APs may further aggregate the locally generated MPDUs into a single A-MPDU and save the A-MPDU in the designated local buffer. Although not shown in FIG. 19, for D-MU-MIMO joint transmissions, prior to the actual joint transmission, the APs need to collect the channel state information (CSI) of the channels between the APs and the Target STAs, for example by performing explicit sounding procedures. The Master AP may instruct each Slave AP to collect CSI of the channel between the AP and Target STAs of interest following traditional 802.11 sounding procedures. The Slave APs would report the CSI to the Master AP. Once the Master AP has collected the CSI from all Slave APs, the Master AP calculates the steering matrix to be used for the joint transmission. The Master AP then distributes the relevant sections of the steering matrix to each Slave AP. This may happen before or after the Data distribution phase. Number 1914 shows the Joint Transmission Trigger frame used to initiate the joint transmission to Target STAs. The JT Trigger frame 1914 initiates the MU joint transmission that uses two Spatial Streams using the steering matrix received from the Master AP. Number 1920 shows Joint transmission to STA1: S.N 1-5 to STA1 using Spatial Stream 1. Number 1922 shows Joint transmission to STA2: S.N 11-15 to STA2 using Spatial Stream 2. 1920 and 1922 take place at the same time but use different spatial streams.

Another problem is that it is not clear how long should a Slave AP save JT Data (e.g., data that was previously distributed by Master AP). Since the buffer space is a limited resource for APs, from the Slave AP's perspective it is beneficial to delete already transmitted JT Data as soon as possible to make room for newer JT Data. However, deleting JT Data too early creates ambiguity issues for joint re-transmissions whereby Master APs are not sure whether Slave APs still possess the JT Data to be re-transmitted, or does it need to re-distribute the JT Data?

Re-distribution and re-transmission have other problems as well. For example, significant protocol overhead exists due to wireless backhaul. When the backhaul transmission and the joint transmission are strongly coupled, this overhead is further increased when there are transmission failures.

Example embodiments solve these problems and provide an acknowledgement procedure for multi-AP joint transmission and re-transmission schemes. Example embodiments also reduce re-transmission overhead.

Figure 20:
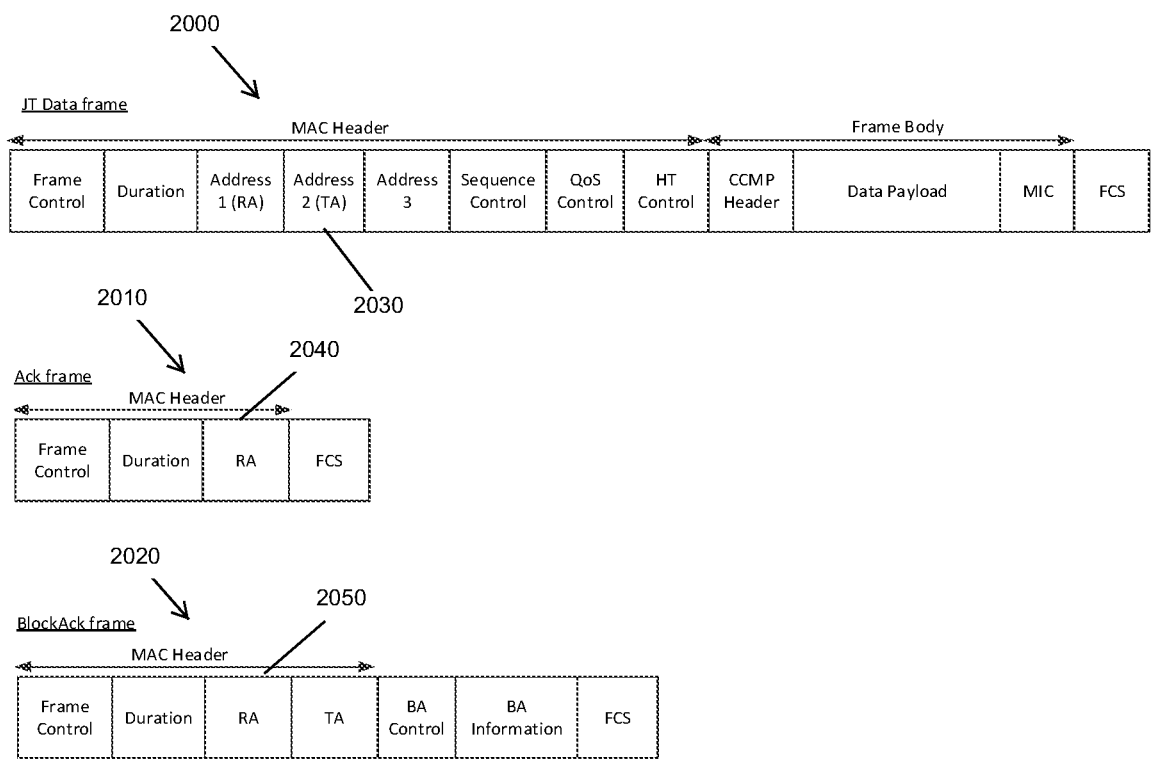
FIG. 20 shows a JT Data frame, an Acknowledgement (ACK or Ack) frame, and BlockAck frame in accordance with an example embodiment.

FIG. 20 shows a JT Data frame 2000, an Acknowledgement (ACK or Ack) frame 2010, and BlockAck frame 2020 in accordance with an example embodiment.

Although multiple APs may participate in a joint transmission, from the Target STA's point of view, it may appear as a single AP transmission. STA may not even be aware of joint transmission. The RA field of the Ack frame or the BlockAck frame is simply copied over from the TA field of JT Data frame, which is usually set as the MAC address of the AP with which the Target STA is associated with. Further, APs by default will not parse Ack or BlockAck frames whose RA field does not match their own MAC address. As a result, those APs are not aware whether the joint transmission was successful or not.

For FIG. 20, the Address 2 (TA) 2030 of the JT Data frame 2000 is set to the MAC address of the associated AP (e.g., the Master AP or one of the Slave APs). Upon successful reception of the JT Data frame 200, the addressed STA acknowledges the JT Data frame by transmitting an ACK frame 2010 or a BlockAck frame 2020. The STA copies the TA field 2030 of the JT Data Frame to the RA field 2040 of the Ack frame 2010 or the RA field 2050 of the BlockAck frame 2020.

Figure 21:
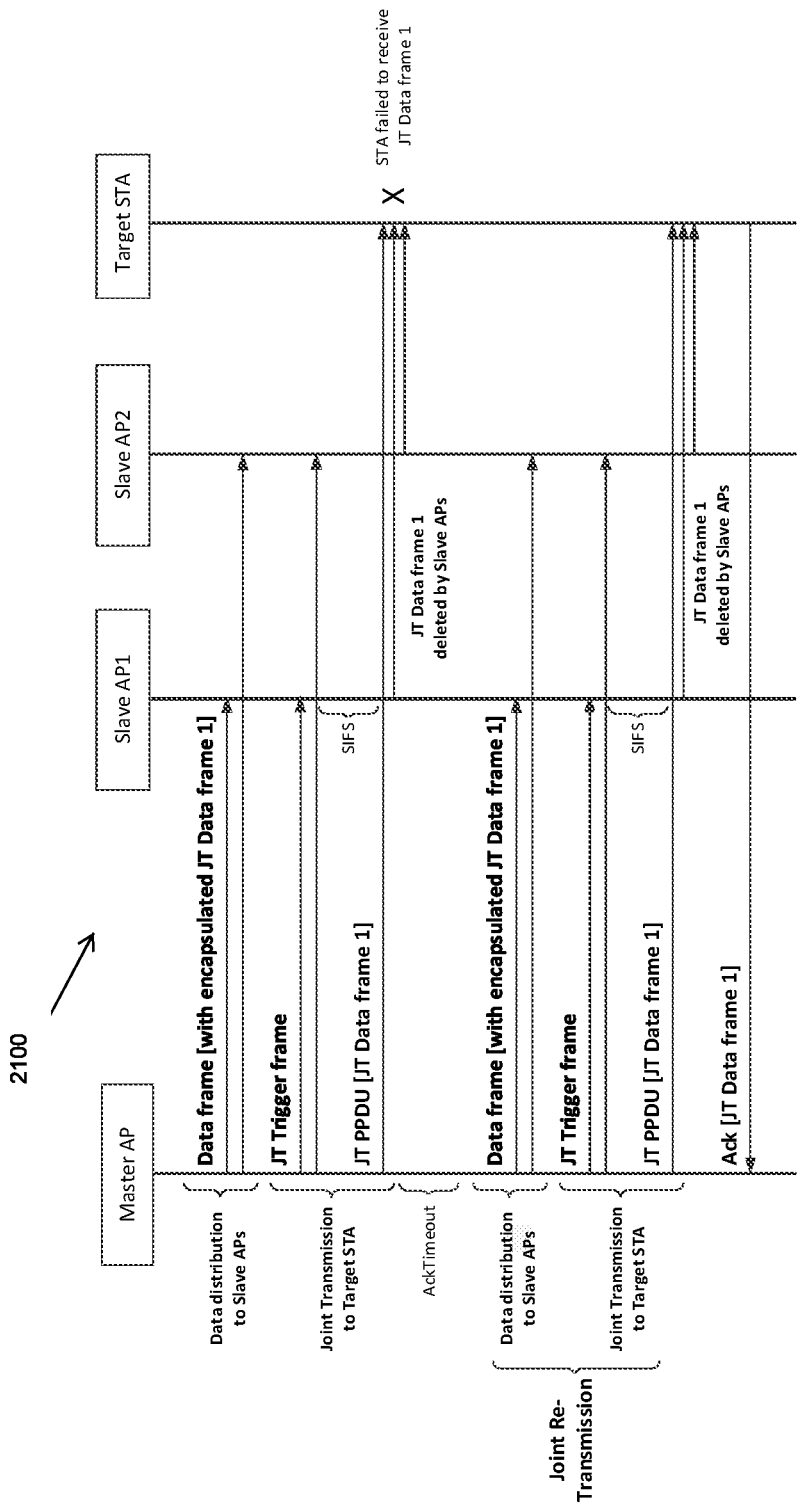
FIG. 21 shows Joint Transmission in which the STA failed to receive the JT Data frame and the Master AP repeats the Joint Transmission procedure in accordance with an example embodiment.

FIG. 21 shows Joint Transmission 2100 in which the STA failed to receive the JT Data frame and the Master AP repeats the Joint Transmission procedure in accordance with an example embodiment.

As noted above, the STA may not even be aware of a Joint Transmission. As such, the ACK is addressed to the TA of JT Data (i.e. Master AP in this example of FIG. 21). In this case, how Slave APs handle JT Data is not standardized so the procedure is straightforward for Slave APs. Transmission overhead, however, is high due to re-distribution of data to Slave APs. Here, Master AP assumes that Slave APs will delete the JT Data immediately after each joint transmission. Master AP initiates re-transmission if the Ack frame is not received within a certain timeout value. In case of re-transmissions, Master AP simply repeats the entire joint-transmission procedure including the data distribution phase.

Alternatively, instead of deleting JT Data from memory after every joint transmission, Slave APs may only keep one JT Data in memory at any one time. If a new JT Data is received from Master AP, the Slave AP will replace existing JT Data if any. In either cases, it can be seen that in case of transmission failures, the re-transmission overhead is high due to re-distribution of data to Slave APs.

Figure 22:
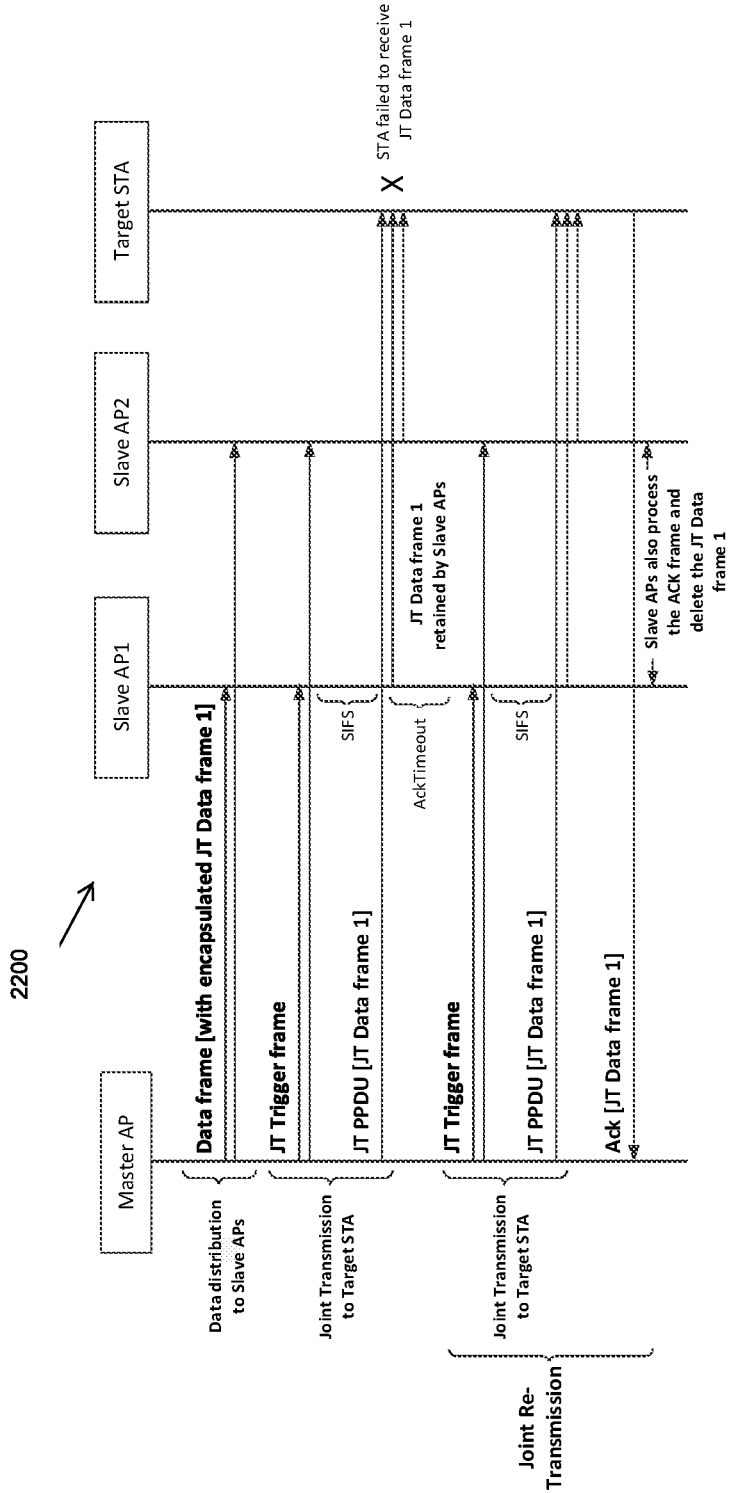
FIG. 22 shows Joint Transmission in which the STA failed to receive the JT Data frame and Slave APs also process Ack frames and the Master AP repeats Joint Transmission without repeating data distribution in accordance with an example embodiment.

FIG. 22 shows Joint Transmission 2200 in which the STA failed to receive the JT Data frame and Slave APs also process Ack frames and the Master AP repeats Joint Transmission without repeating data distribution in accordance with an example embodiment.

As shown in FIG. 22, Slave APs actively participate in the acknowledgement procedure for joint transmission. As discussed more fully below, JT Data is retained by Slave APs until they are successfully acknowledged or the Retry Limits are reached (i.e. Slave APs also follow the re-transmission procedure that are typically followed by a transmitter).

After a Joint Transmission, Slave AP also processes the Ack frame from Target STA (addressed to Master AP, or another Slave AP) as if the ACK frame was addressed to the Slave AP. If the ACK frame is received, the Joint Transmission Data is deleted. If the ACK frame is not received, the Joint Transmission Data is retained for possible re-transmission. Slave APs maintain retry counters (short retry counter or SRC and long retry counter or LRC) for each Joint Transmission MSDU and increment the counters for each Joint Re-transmission. When either retry limit is reached, the corresponding Joint Transmission MSDU is discarded. The retry limits are synchronized between all participating APs, i.e. they should be the same value.

In case of transmission failure, Master AP only repeats the Joint Transmission. Data Distribution is not repeated. During re-transmission, data distribution over the backhaul is skipped. Furthermore, the JT Trigger frame that initiates the joint re-transmission may specify more robust transmission modes (lower MCS etc.) or a different PHY encoding may be specified (e.g., if HARQ retransmission is used).

Figure 23:
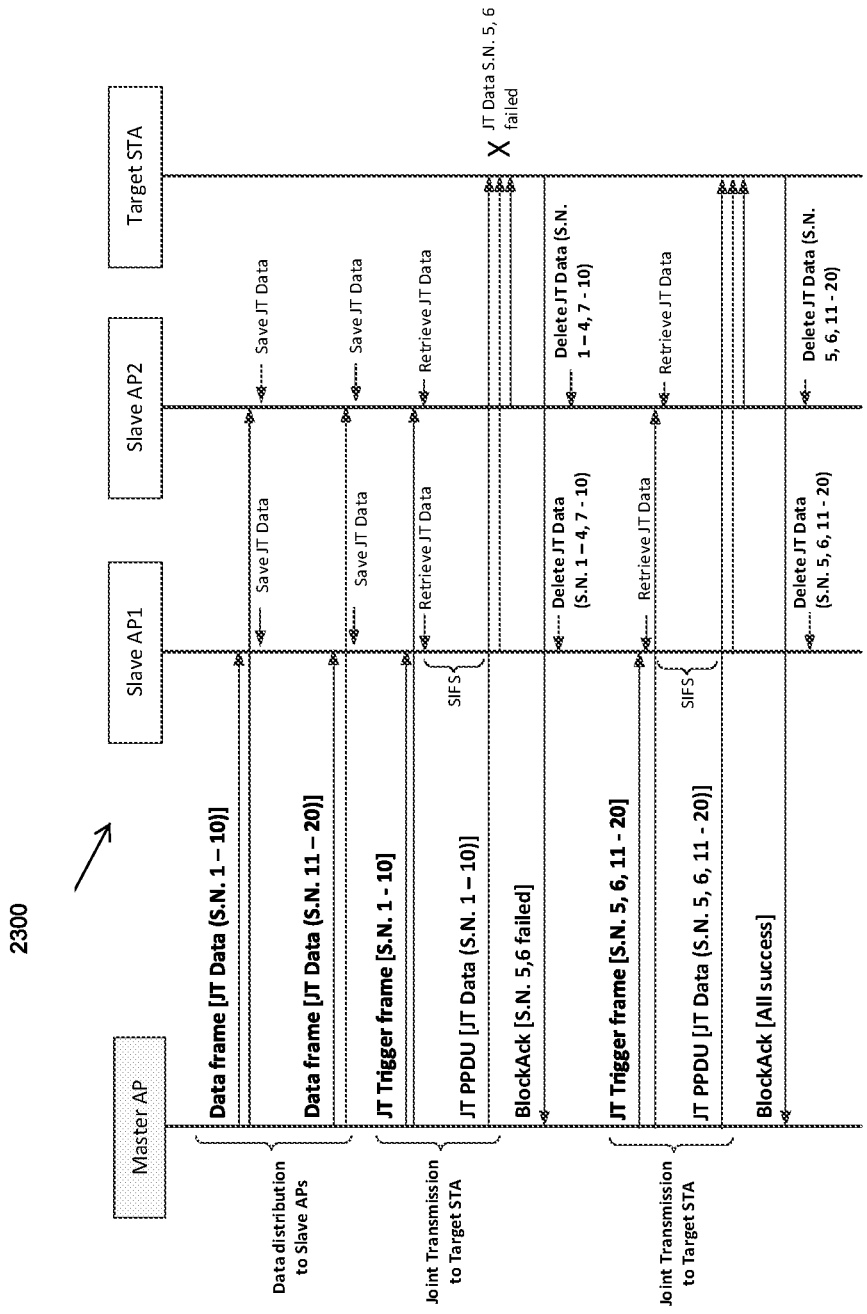
FIG. 23 shows Joint Transmission in which the STA failed to receive JT Data and Slave APs also process BlockAck frames and delete JT data in accordance with an example embodiment.

FIG. 23 shows Joint Transmission 2300 in which the STA failed to receive JT Data and Slave APs also process BlockAck frames and delete JT data in accordance with an example embodiment.

This figure shows an example of aggregated transmission where block acknowledgement is used. During the joint transmission, A-MPDU carrying aggregating multiple MPDUs are jointly transmitted by the APs and the Target STA responds by transmitting a BlockAck frame addressed to the Master AP acknowledging those MPDUs that are successfully received. In this example, the Slave APs also process the BlockAck (BA) frame from the Target STA (addressed to the Master AP) as if the BlockAck frame were addressed to the Slave AP. If the BlockAck frame indicates that a MPDU is received, the MPDU is deleted from the local buffer. If the BlockAck frame indicates that a MPDU is not received, the MPDU is retained for possible re-transmission. In FIG. 23, during the original joint transmission MPDUs with S.N. 1 to 10 are jointly transmitted, however the Target STA failed to receive MPDUs with S.N. 5 and 6 and the BlockAck frame reports MPDUs with S.N. 5 and 6 as not received. After processing the BlockAck Slave AP1 and Slave AP2 delete the transmitted MPDUs except the ones with S.N. 5 and 6. Subsequently the Master AP transmits a JT Trigger frame instructing the re-transmission of MPDUs with S.N. 5 and 6 as well as transmission of MPDUs with S.N. 11 to 20. Since the Slave APs have retained the MPDUs, Master AP does not need to re-distribute the MPDUs with S.N. 5 and 6 to the Slave APs. Due to the need to decode ACK/BA as well as maintain retry counters, the processing burden on Slave APs is increased but the overhead of data distribution is eliminated for re-transmissions.

Slave APs may also delete the saved JT Data based on lifetime timers, or when AP Coordination Sessions are torn down (if session is setup). Further, based on the BA bitmap, MSDUs that have been successfully received by the Target STA are deleted.

Figure 24:
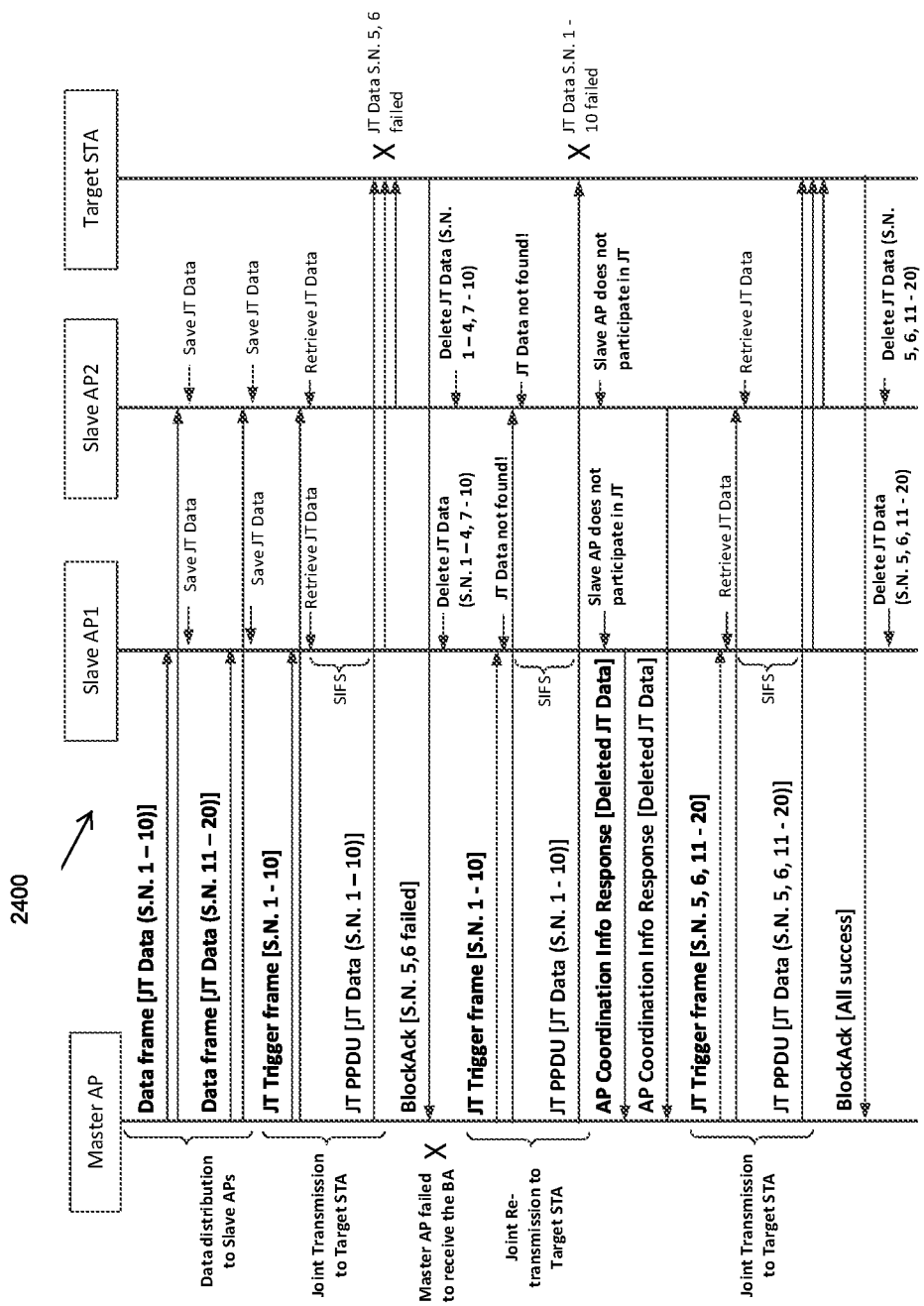
FIG. 24 shows Joint Transmission in which the STA failed to receive JT Data and error recovery in the event where the Master AP fails to receive BlockAck frame in accordance with an example embodiment.

FIG. 24 shows Joint Transmission 2400 in which the STA failed to receive JT Data and Master AP failed to receive the BlockAck frame from the Target STA and error recovery in accordance with an example embodiment.

This figure shows an example of error recovery when due to some reasons the Slave APs receive the Ack/BA frame but the Master AP fails to receive the Ack/BA frame. This situation can happen, for example, if the Master AP is farther away from the Target STA as compared to the Slave APs, or simply due to hidden node interference, etc.

As discussed more fully below, the Slave AP may have already deleted the JT Data referenced in the JT Trigger frame (e.g., when the Slave APs receive the BA for joint transmission, but the Master AP fails to receive the BA). The Slave AP sends a special frame to inform the Master AP about the deleted JT data and the reason for the deletion. The Master AP can re-transmit only the failed MPDUs.

Since the Slave APs received the BA frames that acknowledged MPDUs with S.N. 1-4, 7-10 as successfully received, they may delete those MPDUs from their memory. However, since the Master AP fails to receive the Block Ack (BA) frame, it may assume that the original joint transmission has failed and initiate the joint re-transmission of all MPDUs by transmitting the JT Trigger frame referencing MPDUs with S.N 1-10.

SIFS after the JT Trigger frame, the Master AP transmits the JT PPDU. Since the Slave APs no longer possess some of the MPDUs referenced in the JT Trigger frame, the Slave APs do not participate in the join transmission. Since this is a single AP transmission, the Target STA fails to receive the entire JT PPDU. Based on the content of the JT Trigger frame, the Slave APs can deduce that the Master AP has failed to receive the BA frame. In order to prevent the Master AP from keeping on repeating such re-transmissions attempts, the Slave APs may transmit the AP Coordination Info Response frames to the Master AP to report that some of the MPDUs referenced in the JT Trigger frame have already been deleted and also indicate the deletion reason (e.g. successfully acknowledged). The Master AP may then proceed to selectively re-transmit only the MPDUs that failed (i.e. MPDUs with S.N. 5, 6).

Figure 25:
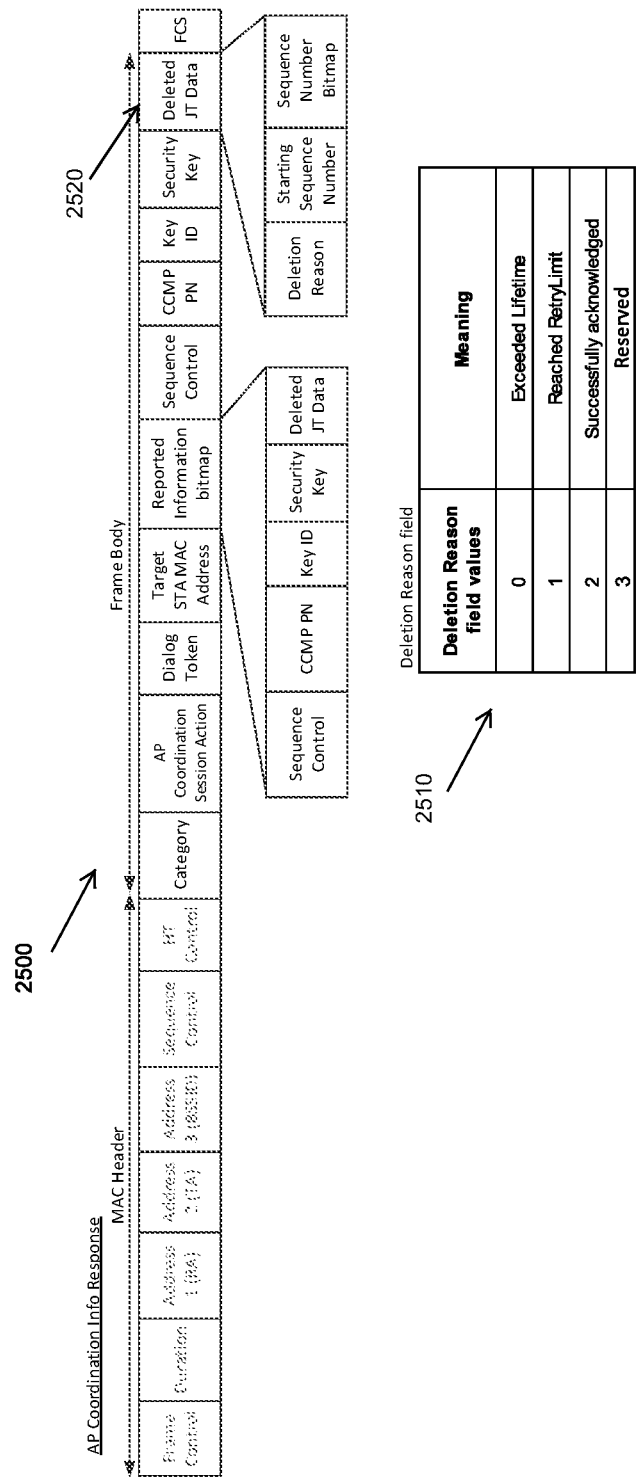
FIG. 25 shows an AP Coordination Info Response frame and a table with deletion reasons in accordance with an example embodiment.

FIG. 25 shows an AP Coordination Info Response frame 2500 and a table 2510 with deletion reasons in accordance with an example embodiment.

The AP Coordination Info Response frame 2500 includes Deleted JT Data 2520 reported to the Master AP. The Deleted JT Data 2520 includes Deletion Reason (shown in table 2510), and Starting Sequence Number, and Sequence Number Bitmap which together indicates the Sequence Number of the MPDUs that have been deleted by the Slave AP.

The table 2510 includes Deletion Reason field values (e.g., 0-3) and meanings associated with the corresponding field value.

Slave APs use the AP Coordination Info Response frames 2500 to inform the currently saved JT Data to the Master AP. The AP Coordination Info Response frame is sent if a JT Trigger frame is received that references JT Data that have been deleted from Slave APs memory.

Upon receiving the AP Coordination Info Response frame 2500 from Slave APs, based on the Deletion Reasons, the Master AP decides the next action. Consider an example in which the reason is Exceeded Lifetime. In this case, the joint transmission may not even have been attempted. The Master AP may re-distribute the JT Data to Slave APs and attempt joint transmission.

Consider another example in which the reason is Reached RetyLimit. In this case, the transmission failed despite the number of joint transmissions so the Master AP may give up the transmission if Retry Limit is reached.

Consider another example in which the reason is Successfully acknowledged. In this case, the Master AP is made aware of the JT Data (MPDUs) whose transmission has failed so Master AP may re-transmit only the failed JT Data that has not been deleted. The JT Data that has been successfully acknowledged are omitted from the joint re-transmissions.

Figure 26:
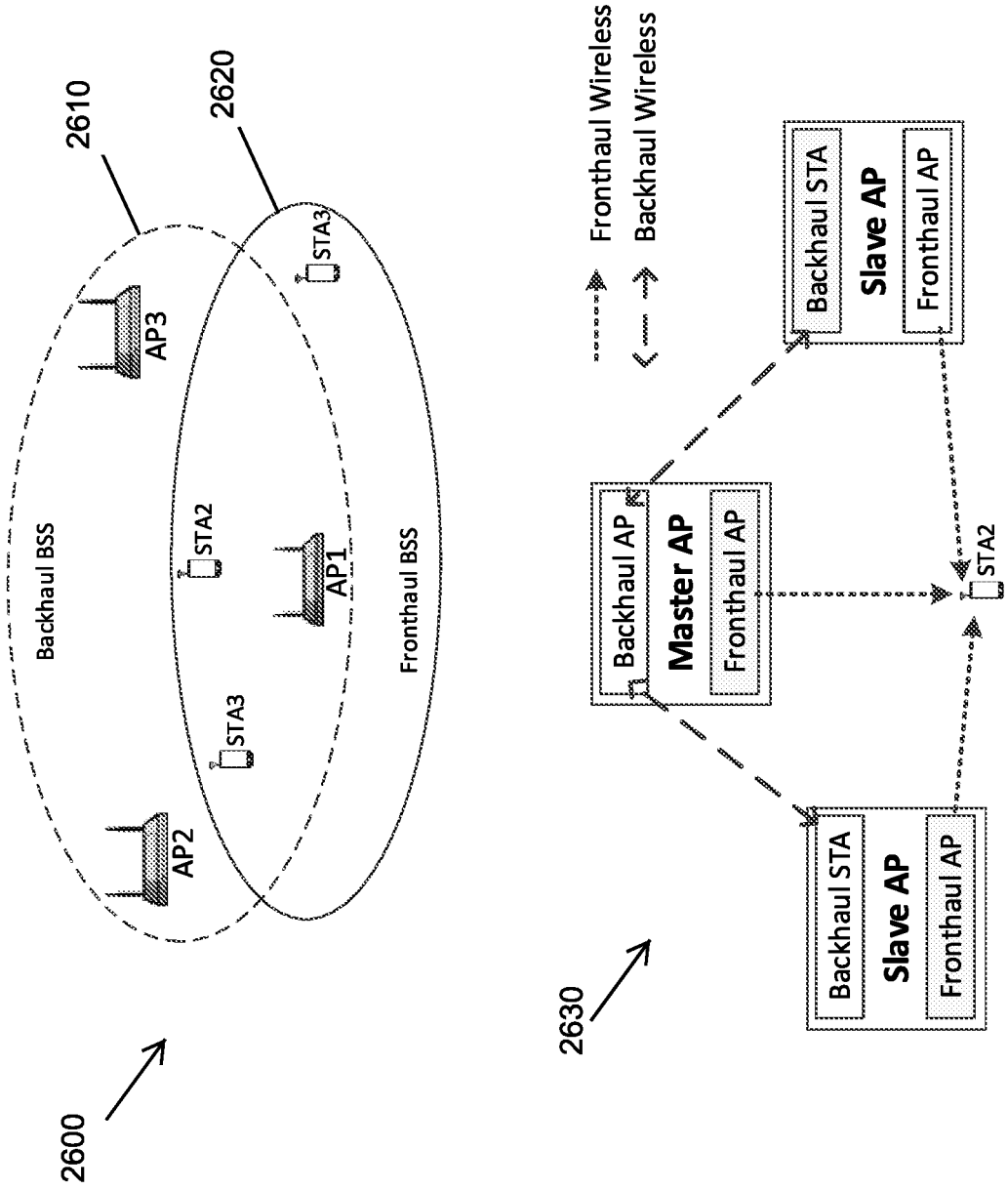
FIG. 26 shows a wireless network and wireless transmissions with a STA in Backhaul and Fronthaul BSSs in accordance with an example embodiment.

FIG. 26 shows a wireless network 2600 and wireless transmissions with a STA in Backhaul and Fronthaul BSSs in accordance with an example embodiment.

The wireless network 2600 includes a Backhaul BSS 2610, a Fronthaul BSS 2620, a plurality of APs (shown as AP1-AP3), and a plurality of STAs (shown as STA1-STA3). The Backhaul BSS is used by the APs to communicate among themselves, while the Fronthaul BSS is used for communications between the APs and STAs. Diagram 2630 shows the transmissions links between the APs in the Backhaul and Fronthaul BSSs. The thick dotted lines represent the transmission links between the APs in the Backhaul BSS, while the thin dotted lines represent the transmission links between the APs and the STAs in the Fronthaul BSS. In this network structure, the Master AP may contain a logical Backhaul AP and a logical Fronthaul AP, while the Slave APs may contain a logical Backhaul STA that associates with the Backhaul AP and a logical Fronthaul AP. The STAs are associated with the Fronthaul APs of either the Master AP or the Slave APs. The MAC addresses of the Fronthaul and Backhaul entity in each AP may be different.

In order to make it easier for Slave APs to identify the Ack/BA frames for Joint Transmissions, it is also possible that the Master AP may assign a unique MAC Address to be used as the TA (Transmitter Address) in the MAC Headers of jointly transmitted frames (e.g., see frames in FIG. 20). Such MAC Address may be called Joint Transmission Transmit Address (JT TA) or Joint Transmission MAC Address.

One such example is given here: The MAC address of the backhaul AP may be used as TA for joint transmissions. This may also be the BSSID of the backhaul BSS. Here, the Slave APs only process the Ack/BA frames with RA fields set to JT TA. In this case the Target STAs also need to be aware of the JT TA. Prior to the Joint transmission, the associated AP informs the JT TA to the Target STAs which save the JT TA in memory. Due to the presence of JT TA, STAs are also aware of joint transmissions.

It is possible that the Master AP may dynamically switch between single AP transmission to joint transmissions based on channel conditions, and the allocation of sequence numbers to MPDUs may become an issue. For example, initially the AP may attempt single AP transmission and switch to multi-AP joint transmissions upon repeated failure of the single AP transmission even after using the most robust MCS etc. In order to simplify the Sequence Number planning, for transmissions to a particular Target STA, the Master AP may use running sequence numbers from the same sequence number space for both normal transmissions (single AP transmissions using Master AP's MAC address as the TA) as well as for joint transmission (using JT TA as the TA). In this case, the MPDU ordering for the Target STA is easy since the MPDUs can be ordered based on the sequence numbers without regard of the TA (either JT TA or Master AP's MAC Address). On the contrary, the Block Ack score-boarding procedure at Slave APs may be slightly more complicated since only a portion of the scoreboard bitmap may be used during the joint transmission acknowledgment.

Figure 27:
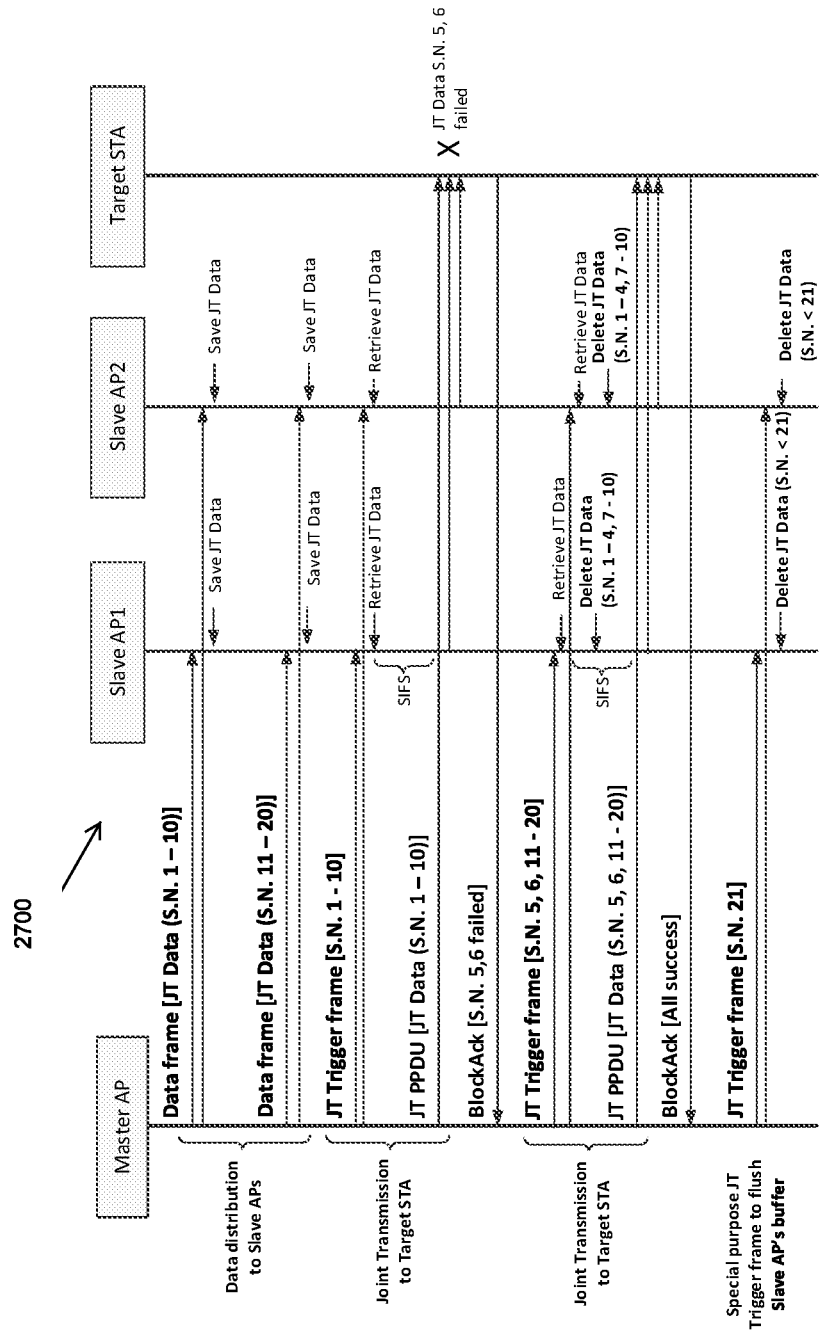
FIG. 27 shows Joint Transmission in which the STA failed to receive JT Data and Slave APs use the JT Trigger frame to delete JT MPDUs in accordance with an example embodiment.
Figure 28:
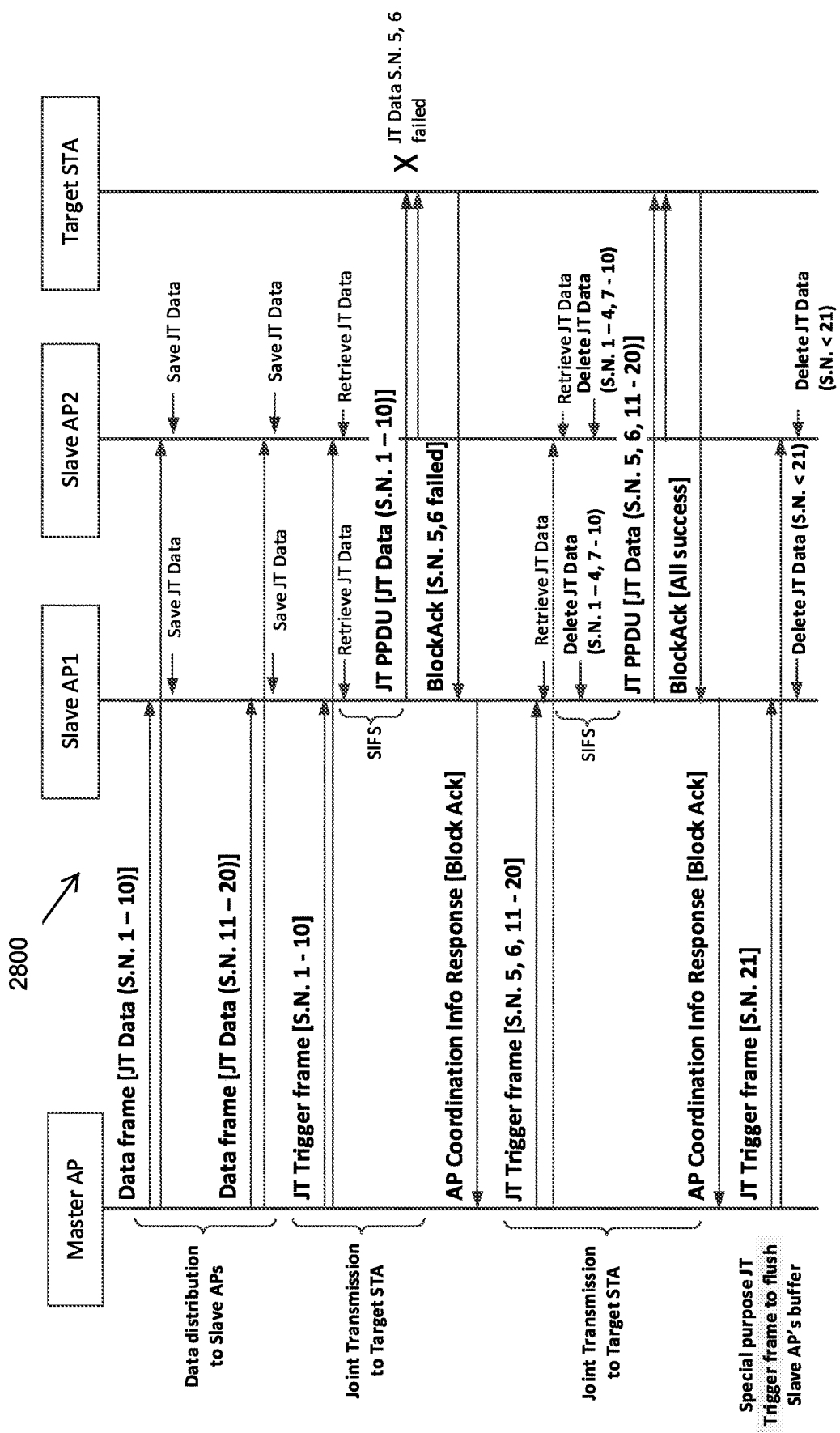
FIG. 28 shows Joint Transmission in which the STA failed to receive JT Data and Slave APs relay information about the acknowledgement frames to the Master AP in accordance with an example embodiment.
Figure 29:
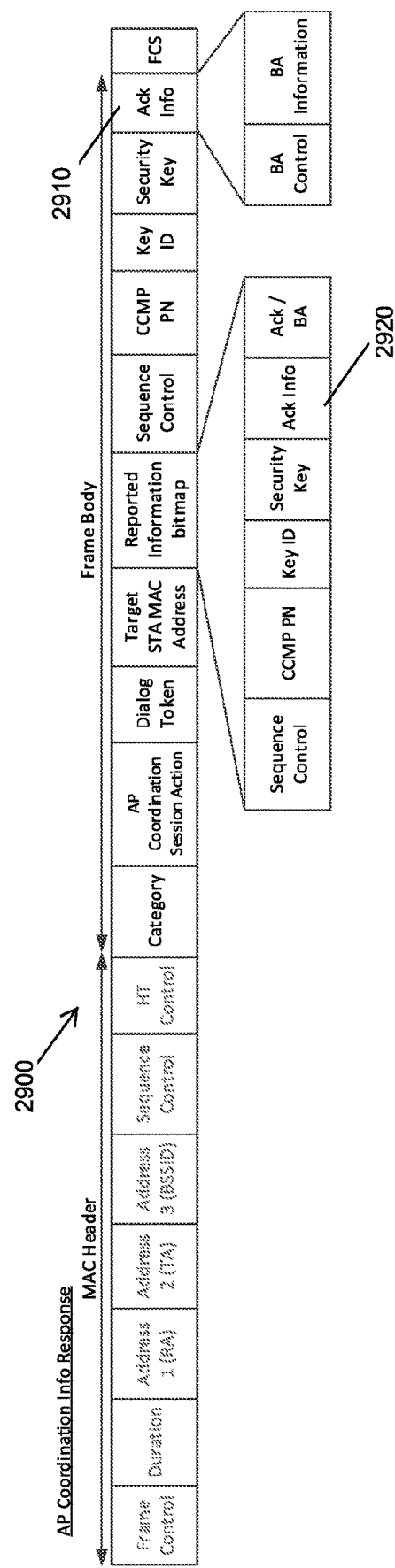
FIG. 29 is an AP Coordination Info Response frame in accordance with an example embodiment.
Figure 30:
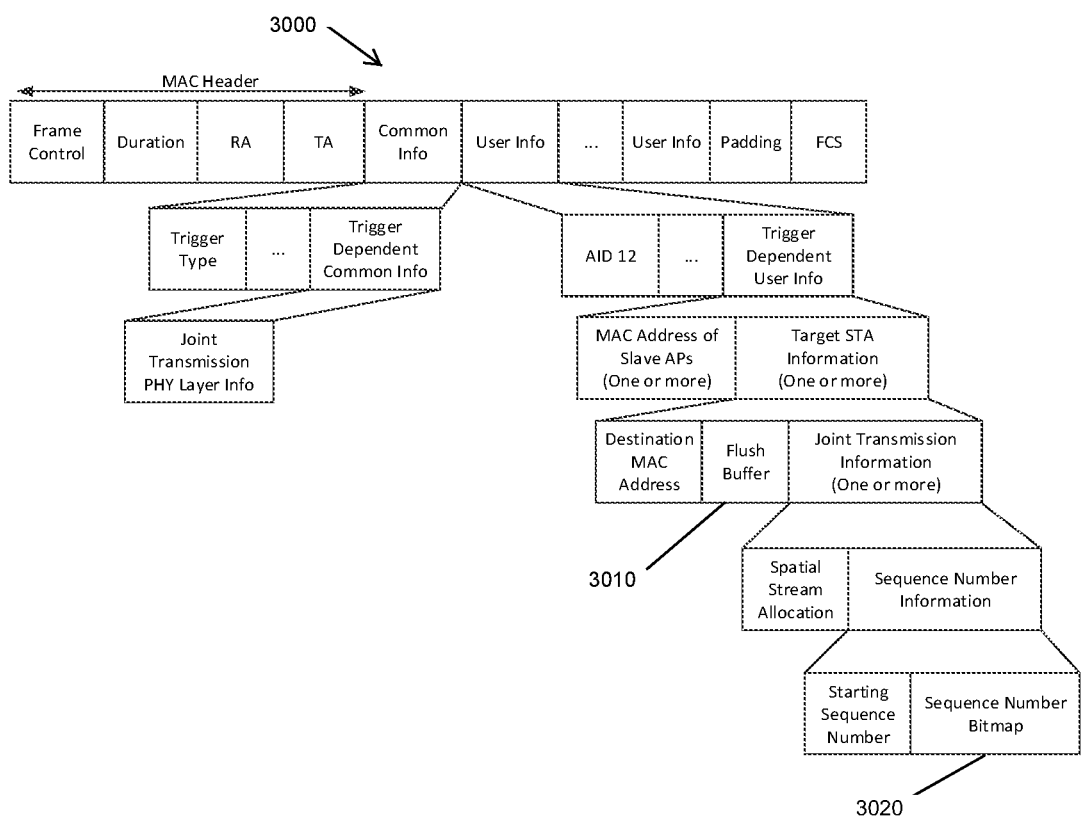
FIG. 30 is a JT Trigger frame with an indication to flush the buffer in accordance with an example embodiment.
Figure 31:
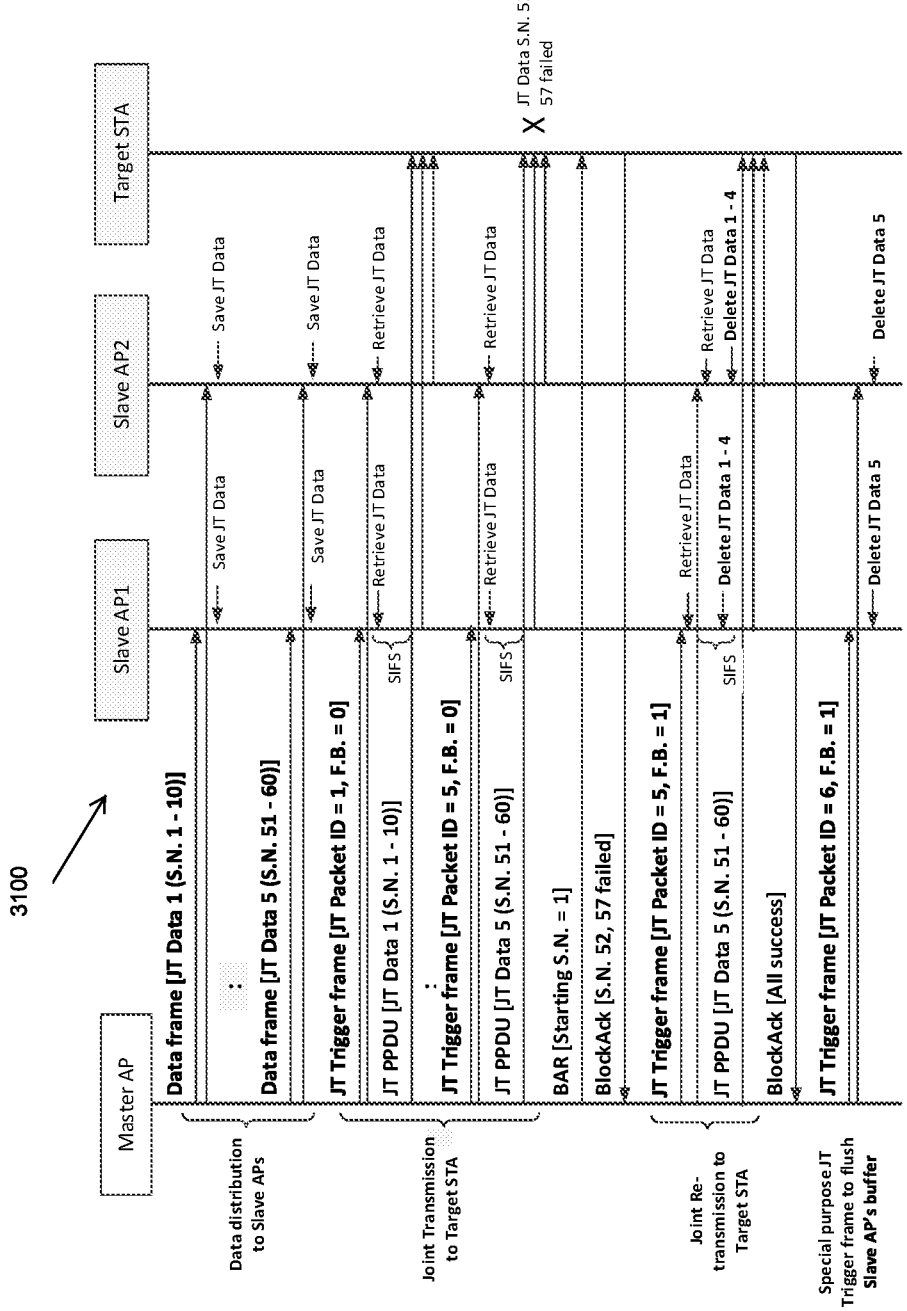
FIG. 31 shows Joint Transmission in which the STA failed to receive JT Data and non-immediate BlockAck is supported for Joint Transmission in accordance with an example embodiment.
Figure 32:
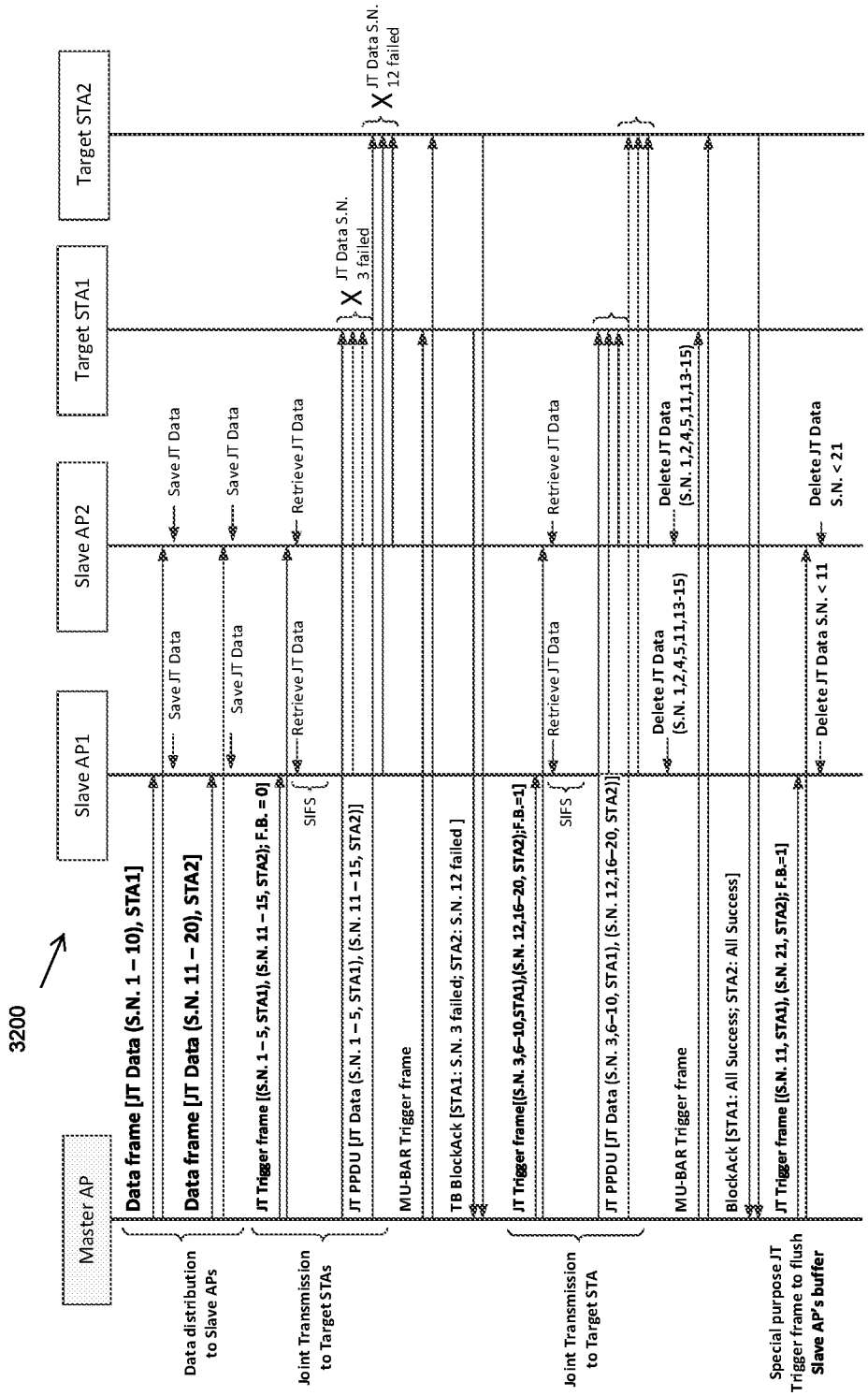
FIG. 32 shows a Distributed MU-MIMO Joint Transmission in which the STA failed to receive JT Data and non-immediate BlockAck is supported for Joint Transmission in accordance with an example embodiment.

FIGS. 27-32 show two more example embodiments (FIGS. 27-29 showing one embodiment, and FIGS. 30-32 showing another embodiment). In these embodiments, Slave APs do not actively participate in the acknowledgement procedure for joint transmission. Only Master AP/or the AP whose MAC Address appears in the TA field of the jointly transmitted frames need to process the Ack/BA frames. This reduces the frame processing burden on Slave APs.

In FIGS. 27-29, it is assumed that each Joint Transmission is immediately acknowledged by the Target STA and non-immediate BA is not used. Non-immediate BlockAck here refers to transmission in which the Ack Policy of the transmitted frames is set to Block Ack. In this case, the addressed recipient takes no action upon the receipt of the frame except for recording the state. The recipient can expect a BlockAckReq frame or implicit block ack request in the future.

The JT Trigger frame serves two purposes. First, the JT Trigger frame serves an original (explicit) purpose to initiate joint transmission and reference the JT Data to be jointly transmitted. Second, the JT Trigger frame serves a new purpose (implicit) to indicate the transmission status of earlier joint transmissions.

FIG. 27 shows Joint Transmission 2700 in which the STA failed to receive JT Data and Slave APs use the JT Trigger frame to delete JT MPDUs in accordance with an example embodiment.

In this figure, Slave APs use the content of the JT Trigger frame to delete JT MPDUs that are inferred as successfully transmitted. MPDUs that have already been jointly transmitted are deleted if they are not listed to be re-transmitted. Master AP may also use a JT Trigger frame solely to signal Slave APs to flush their JT MPDUs.

Based on the list of MPDUs to be jointly transmitted, Slave APs infer the MPDUs that have been successfully transmitted and eligible to be discarded. Further, JT Trigger frame listing a new (unsaved) MPDU triggers the deletion of older MPDUs. In FIG. 27, during the original joint transmission MPDUs with S.N. 1 to 10 are jointly transmitted, however the Target STA failed to receive MPDUs with S.N. 5 and 6 and the BlockAck frame reports MPDUs with S.N. 5 and 6 as not received. After processing the BlockAck the Master AP transmits a JT Trigger frame instructing the re-transmission of MPDUs with S.N. 5 and 6 as well as transmission of MPDUs with S.N. 11 to 20. Based on the content of this JT Trigger frame, the Slave APs infer that MPDUs with S.N. 1 to 4 and S.N. 7 to 10 have been successfully received by the STA and can proceed to delete them. All APs also proceed to jointly transmit MPDUs with S.N. 5 and 6 as well as MPDUs with S.N. 11 to 20. Upon successful reception of all MPDUs the Target STA responds with a BlockAck frame indicating the same. Since the Master AP has no further MPDUs to be jointly transmitted, it transmits a special purpose JT Trigger frame that lists a previously not transmitted MPDU with S.N. 21. The sole purpose of the JT Trigger frame is to trigger the flushing of the buffers at the Slave AP. Upon receiving the JT Trigger frame listing a new (unsaved) MPDU with S.N. 21, the Slave AP proceeds to delete the older MPDUs saved in its buffer.

FIG. 28 shows Joint Transmission 2800 in which the STA failed to receive JT Data and Slave APs relay information about the acknowledgement frames to the Master AP in accordance with an example embodiment.

This figure shows a deployment case where the Target STA is associated with a Slave AP and the Master AP does not participate in the actual joint transmission. Only Slave APs participate in the actual joint transmission. The RA field of the Ack/BA frames are set as the MAC Address of one of Slave APs. The Master AP may not receive/process the Ack/BA frame for joint transmission and needs Slave APs to relay such information to it for it to make decision about re-transmissions.

In this example, the Target STA is associated with Slave AP1 and hence the BlockAck is addressed to Slave AP1. Since Slave AP1 receives the BlockAck frame it can delete the MPDUs based on the content of the BlockAck frame and need not wait for the subsequent JT Trigger frame for the deletion decision. Additionally, the Slave AP1 also forwards the content of the Block Ack to the Master AP. The other Slave APs, i.e. Slave AP2 in this example need not explicitly participate in the acknowledgement procedure for joint transmission but can use the subsequent JT Trigger frame to decide whether to delete the transmitted MPDUs as explained earlier. Only the associated AP is involved in processing the Ack/BA frames.

FIG. 29 is an AP Coordination Info Response frame 2900 in accordance with an example embodiment that may be used by a Slave AP to forward the contents of the received Ack/Block Ack frames to the Master AP.

If the Target STA is associated with a Slave AP, the Slave APs uses the AP Coordination Info Response frames 2900 to forward the content of the Ack frame or BlockAck frames received from Target STA to the Master AP. The AP Coordination Info Response frame is not sent by Slave APs if the Ack/BA frame is not received from Target STA.

The frame body includes Ack Info 2910 that carries the content of the Ack frame or Block Ack frame received from the Target STA. The Ack Info 2910 includes BA Control field and BA Information field. If forwarding info of Ack frame, the BA Control field contains the Sequence Control field of the Ack frame and the BA information field is omitted. If forwarding info of BlockAck frame, the BA Control field and the BA Information field of the received BlockAck frame is copied over to the respective fields of the Ack Info field.

Further, the Ack Info 2920 is set to one if the Ack Info field is included in the Frame Body and the Ack/BA field indicates whether the Ack Info field 2910 carries the content of Ack frame or BlockAck frame, e.g. value of 0 signaling Ack frame and value of 1 signaling BlockAck frame.

Execution of the frame of FIG. 29 reduces data distribution overhead while keeping operations simple for the Slave APs.

FIG. 30 is a JT Trigger frame 3000 with an explicit indication to flush the buffer in accordance with an example embodiment.

The JT Trigger frame 3000 includes a Flush Buffer field 3010 with an indication whether to flush the buffer, i.e. delete JT Data that are no longer required to be saved. For example, if Flush Buffer bit is set to 1, previously transmitted JT Data with JT Identity (S.N. or JT Packet ID) that are not listed in the JT Trigger frame are deleted from a Slave APs memory. If the Flush Buffer bit is set to 0, saved JT Data are retained.

The frame 3000 also includes a Sequence Number Information field 3020. When used as a Special purpose JT Trigger frame to flush Slave APs buffer, the bitmap may be omitted or set to all zeros.

FIG. 31 shows Joint Transmission 3100 in which the STA failed to receive JT Data and non-immediate BlockAck is supported for Joint Transmission in accordance with an example embodiment.

This figure shows an example for Transmit Diversity or SU-MIMO case when Non-immediate BlockAck is supported for Joint Transmission. Non-immediate BlockAck refers to transmissions in which the Ack Policy is set to Block Ack. In this case, the addressed recipient takes no action upon the receipt of the frame except for recording the state. The recipient can expect a BlockAckReq frame or implicit block ack request in the future.

During joint transmissions, if the Ack Policy of the jointly transmitted frames are set as "Block Ack", the Target STA does not respond immediately but waits for a BlockAckReq frame to send back the BlockAck frame. In such cases, it is possible that two or more sets of JT Trigger frame and JT PPDU may be transmitted one after another before the acknowledgement for a previous joint transmission is received. In order to prevent a subsequent JT Trigger frame from triggering the deletion of JT Data that was transmitted earlier in this transmission burst, even before receiving any confirmation from the Target STA about the reception status, the "Flush Buffer" indication is set to disable (0) during an original joint transmission. The Master AP may set the "Flush Buffer" indication to enable (1) in a JT Trigger frame that initiates a joint re-transmission to signal to the Slave APs that it is now safe to delete the previously transmitted JT Data that are not referenced in this JT Trigger frame.

Thus, the JT Trigger frame can carry an explicit instruction (e.g., via setting a bit to a 1 or 0) whether or not to flush the Slave's AP buffer. The JT Trigger frame [JT Packet ID=5, F.B=1] signals to the Slave APs that JT Packets with IDs less than 5 can be safely deleted from memory while the JT Packet with ID 5 is to be jointly re-transmitted. Further, the JT Trigger frame [JT Packet ID=6, F.B=1], listing a new (unsaved) JT Data and F.B.=1 triggers the deletion of all older JT Data.

FIG. 32 shows a Distributed MU-MIMO Joint Transmission 3200 in which the STA failed to receive JT Data and non-immediate BlockAck is supported for Joint Transmission in accordance with an example embodiment.

This figure is an example of Distributed MU-MIMO case for simultaneous joint transmission to two Target STAs. Usage of the Flush Buffer indication is the same with some differences in the signaling of the JT Data in the JT Trigger frame. As one difference, different data are transmitted over different spatial streams to different STAs during the joint transmission and the JT Data for different Target STAs may be different within the same joint transmission. As another difference, the BlockAck frames from the Target STAs are solicited using a MU-BAR frame (Multiuser BlockAckReq frame).

Figure 33:
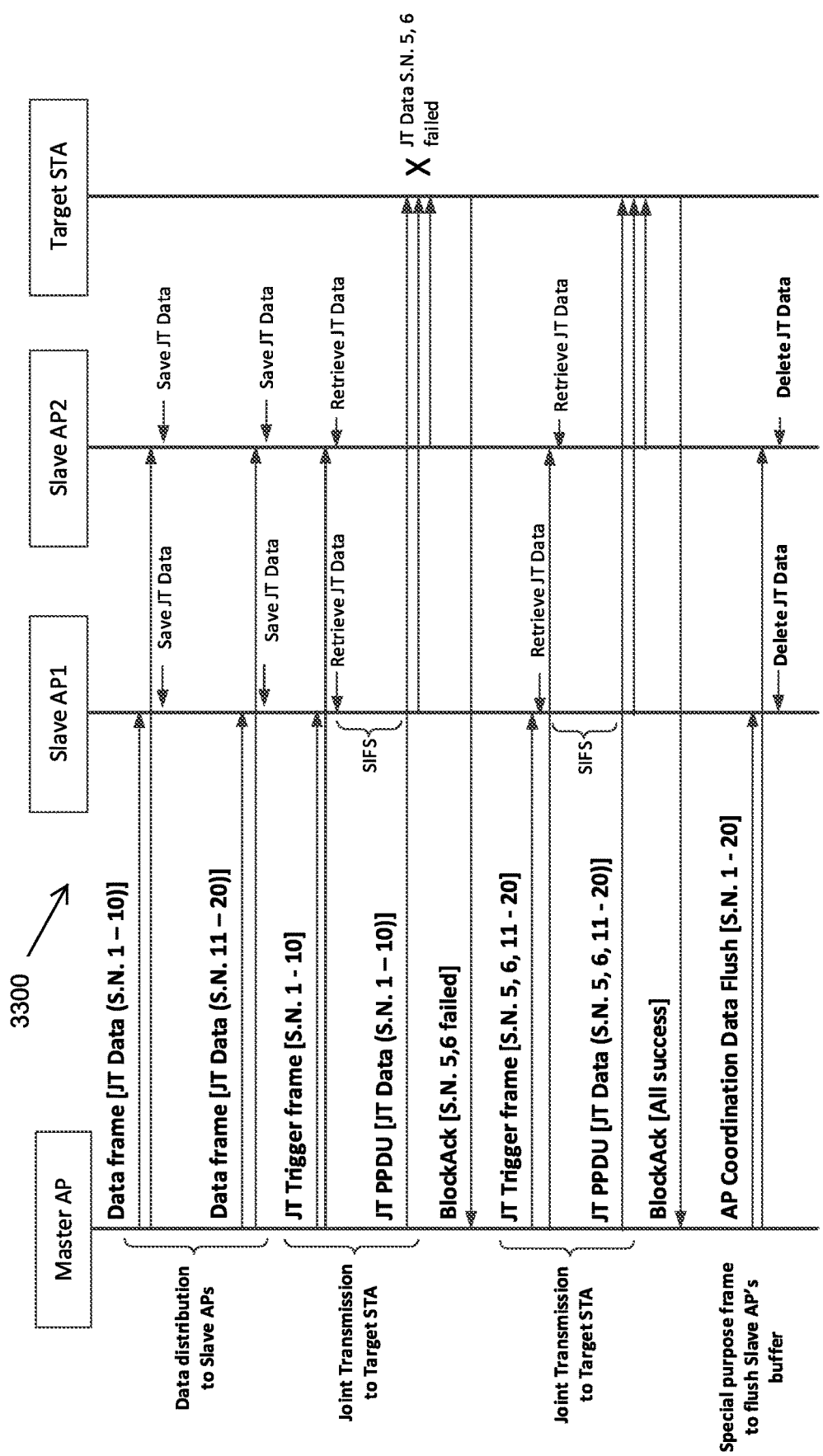
FIG. 33 shows Joint Transmission in which the STA failed to receive JT Data and a special purpose frame instructing Slave APs to delete saved JT data in accordance with an example embodiment.

FIG. 33 shows Joint Transmission 3300 in which the STA failed to receive JT Data and a special purpose frame instructing Slave APs to delete saved JT data in accordance with an example embodiment.

A Special purpose frame is defined to be used by the Master AP to instruct Slave APs to delete saved JT Data. Slave APs retain the save JT Data until the frame is received. The JT Trigger frame is only used for initiating joint transmission (i.e. not used to decide when to flush buffer).

This figure illustrates an example embodiment in which the Master AP is in complete charge of how long the Slave APs retain the JT Data. A distinct frame (AP Coordination Data Flush) is used by the Master AP to instruct slave APs to flush their buffers. The Slave APs retain all JT Data until the AP Coordination Data Flush is received indicating the JT Data that may be deleted.

Figure 34:
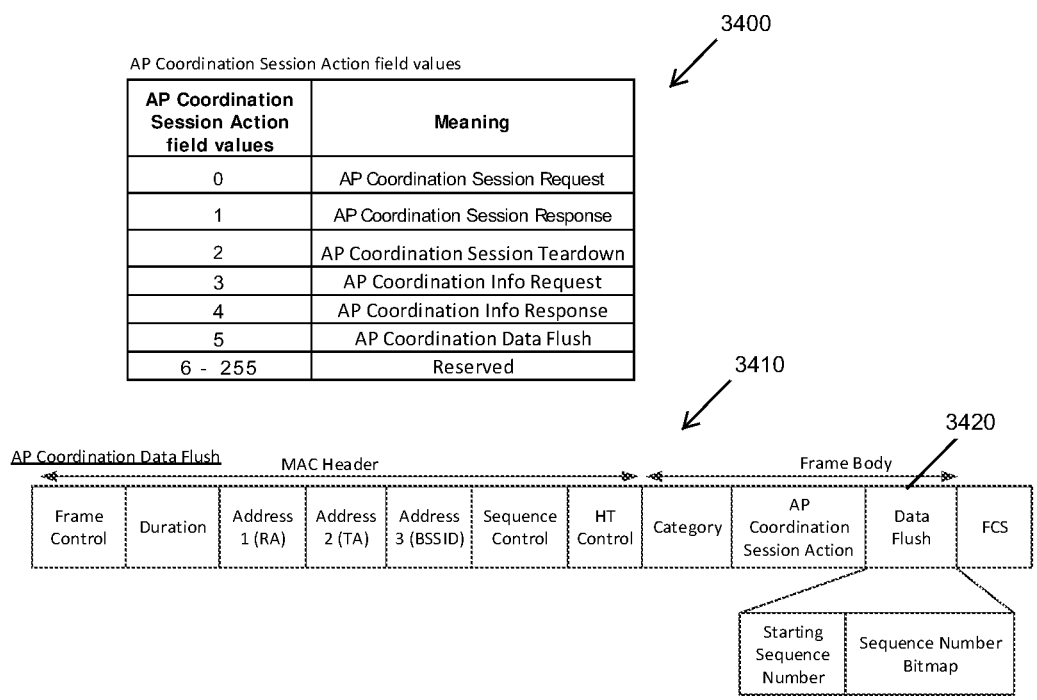
FIG. 34 shows a table for AP Coordination Session Action field values and an AP Coordination Data Flush frame in accordance with an example embodiment.

FIG. 34 shows a table 3400 for AP Coordination Session Action field values and an AP Coordination Data Flush frame 3410 in accordance with an example embodiment.

Master AP uses the AP Coordination Data Flush Action frame 3410 to instruct Slave APs to delete saved JT Data. The AP Coordination Data Flush frame may be an AP Coordination Action frame with the AP Coordination Session Action field set to 5 (AP Coordination Data Flush). The AP Coordination Data Flush frame may be sent after each Ack/BA received by the Master AP, or it may be sent upon completion of the entire joint transmission (including re-transmissions).

The frame includes a Data Flush field 3420 having a Starting Sequence Number field and a Sequence Number Bitmap field, the two fields together indicating the S.N. of MPDUs that may be deleted from a Slave AP's buffer. When used at the end of a joint transmission burst, the value of the Starting Sequence Number field may be set to a value larger than the largest S.N. among the saved JT Data, in which case the Slave AP flushes all saved JT Data (regardless of previous transmission status). In such case the Sequence Number Bitmap may be set to all zeros to differentiate this special usage.

Figure 35:
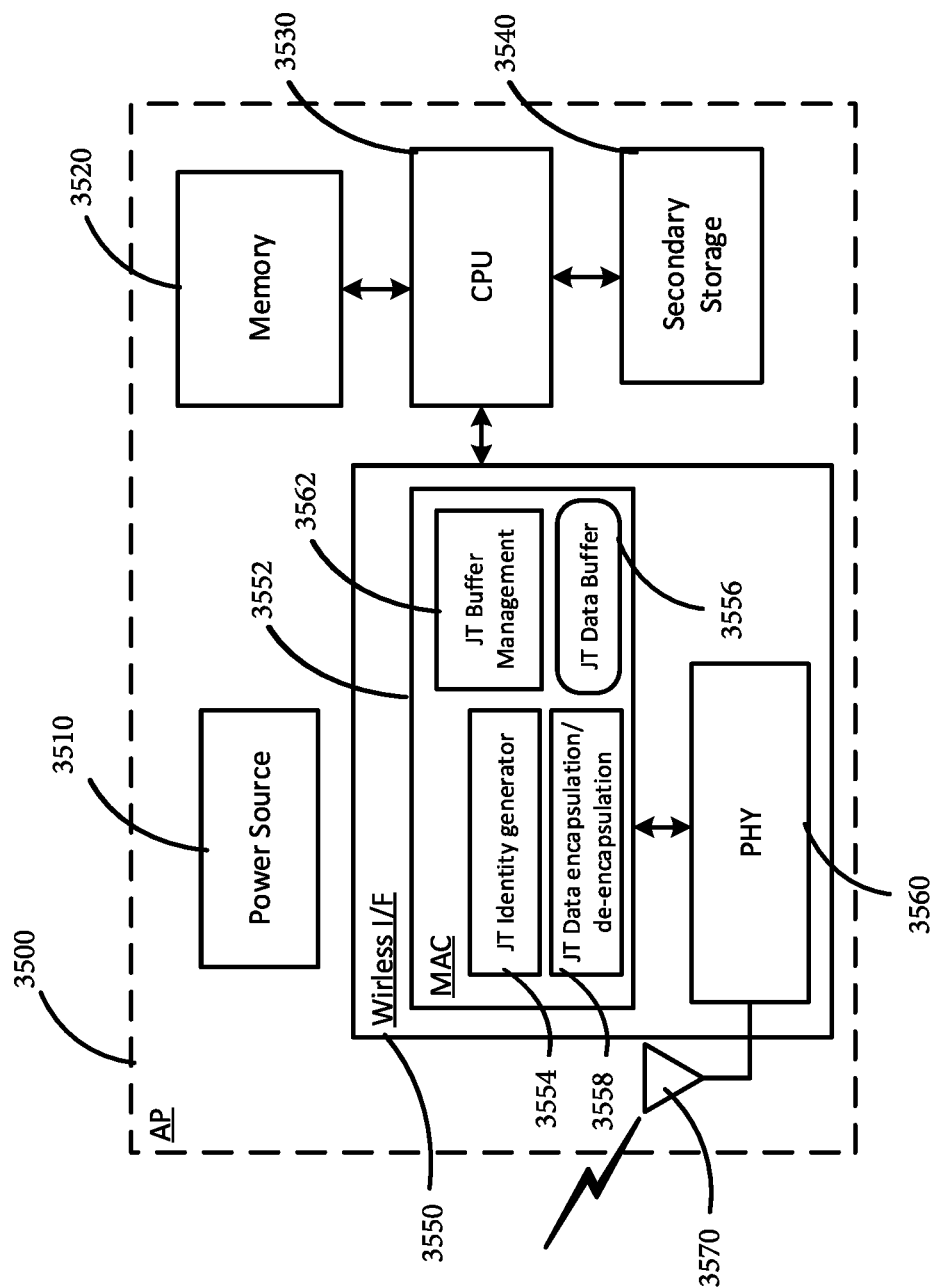
FIG. 35 is an electronic device in accordance with an example embodiment.

FIG. 35 is an example of an electronic device 3500 in accordance with an example embodiment.

The electronic device 3500 includes a power source 3510, memory 3520, central processing unit (CPU) 3530, secondary storage 3540, and wireless I/F 3550 (including a transmitter and/or receiver). The wireless I/F 3550 includes a MAC 3552 and PHY 3560 in communication with an antenna 3570. The MAC 3552 further includes a JT Identity generator 3554, JT Data Buffer 3556, a JT Data encapsulation/de-encapsulation 3558, and JT Buffer Management 3562.

Consider an example embodiment in which the electronic device 3500 is an AP, such as a Master AP or Slave AP (noting that the JT Identity generator 3554 is only present in Master AP).

The electronic device 3500 includes circuitry that operates to receive (e.g., at a wireless receiver) a Joint Transmission (JT) Trigger frame from another AP that indicates MAC protocol data units (MPDUs) to be jointly transmitted to a communication apparatus. The JT Data Buffer 3556 (which may be a logical portion of the memory 3520) stores one or more MPDUs previously transmitted to the communication apparatus as well as MPDUs distributed by another AP for joint transmissions.

In an example embodiment, the JT Buffer Management 3562 makes the decision how long JT Data should be retained in the JT Data Buffer 3556. The JT Buffer Management 3562 is also responsible for processing the Ack/BA frame, the JT Trigger frames, or the AP Coordination Data Flush frames in order to reach such decisions.

The electronic device 3500 includes circuitry that operates to generate a frame that includes the JT data and a JT identity that uniquely identifies the JT data. For example, the JT Identity generator block 3554 is responsible for generating the JT identity corresponding to the JT Data distributed to the Slave APs. The JT Data encapsulation/de-encapsulation block 3558 is used by the Master AP to encapsulation the JT Data within an 802.11 Data frame or an 802.3 Ethernet frame during data distribution phase. The block is used by the Slave AP to de-encapsulate the JT Data received from Master AP. The JT Data Buffer 3556 stores the JT Data used for joint transmission. In the Master AP, this may not be a separate buffer but may be a shared buffered that stores all outgoing data frames. In the Slave AP, this may be a separate buffer used exclusively to store data frames to be used for joint transmissions. The electronic device 3500 further includes circuitry, such as a wireless transmitter and/or antenna 3570, that enable the APs to transmit the data frames to one or more communication apparatus, such as to one or more STAs in a wireless network.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g, cellular (cell) phone, smart phone), a tablet, a personal computer (PC) (e.g., laptop, desktop, netbook), a camera (e.g., digital still/video camera), a digital player (digital audio/video player), a wearable device (e.g, wearable camera, smart watch, tracking device), a game console, a digital book reader, a telehealth telemedicine (remote health and medicine) device, and a vehicle providing communication functionality (e.g., automotive, airplane, ship) and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Other example embodiments include but are not limited to the following examples.

One example embodiment is an access point (AP) that comprises a receiver, which, in operation, receives a Joint Transmission (JT) Trigger frame from another AP that indicates MAC protocol data units (MPDUs) to be jointly transmitted to a communication apparatus;

and a local memory that stores one or more MPDUs previously transmitted to the communication apparatus.

The JT Trigger frame includes an explicit indication whether the one or more MPDUs previously transmitted to the communication apparatus are to be deleted from the local memory.

The local memory stores the one or more MPDUs previously transmitted to the communication apparatus until receiving the JT Trigger frame.

The JT Trigger frame includes Sequence Number values of the MPDUs to be jointly transmitted to the communication apparatus, and the AP deletes from the local memory the previously transmitted MPDUs with the Sequence Number values that are not indicated in the JT Trigger frame.

The AP further comprises a transmitter, which in operation, transmits, upon not being in possession of the MPDUs that are indicated to be jointly transmitted in the JT Trigger frame, a frame to the another AP that includes Sequence Number values of MPDUs that have been deleted from the local memory and a reason for deleting the MPDUs from the local memory.

The receiver further operates to receive an Acknowledgment (ACK) frame or Block Ack (BA) frame from the communication apparatus acknowledging successfully received MPDUs that were jointly transmitted by the one or more other APs and the AP, and the ACK frame or BA frame being addressed to the AP; and the AP further comprising: a transmitter, which in operation, transmits a frame carrying the content of the ACK frame or the BA frame to the another AP.

Another example embodiment is an access point that comprises circuitry, which, in operation, determines that a communication apparatus failed to receive one or more MAC protocol data units (MPDUs) that were jointly transmitted by the AP and another AP to the communication apparatus; and a transmitter, which, in operation, transmits a Joint Transmission (JT) Trigger frame to the another AP without re-distributing failed MPDUs to the another AP.

The JT Trigger frame indicates the MPDUs to be jointly transmitted again to the communication apparatus.

Another example embodiment is a method that comprises receiving, at an access point (AP) a Joint Transmission (JT) Trigger frame from another AP that indicates MAC protocol data units (MPDUs) to be jointly transmitted to a communication apparatus; and storing, in a local memory of the AP, one or more MPDUs previously transmitted to the communication apparatus.

Another example embodiment is a method that comprises determining, at an access point (AP), that a communication apparatus failed to receive one or more MAC protocol data units (MPDUs) that were jointly transmitted by the AP and another AP to the communication apparatus; and transmitting, by the AP, a Joint Transmission (JT) Trigger frame to the another AP without re-distributing failed MPDUs to the another AP.

Another example embodiment is an access point (AP) that comprises a transmitter, which in operation jointly transmits, with another AP, MAC protocol data units (MPDUs) to a communication apparatus; and a receiver, which, in operation, receives an Acknowledgment (ACK) frame or Block Ack (BA) frame from the communication apparatus acknowledging the MPDUs that were successfully received, wherein a receiver address in the ACK frame or BA frame is different from the MAC address of the transmitter, and the AP deletes from local memory MPDUs with Sequence Control values that are acknowledged by the ACK frame or BA frame as successfully received by the communication apparatus.

The AP further saves, in local memory of the AP, MPDUs with Sequence Control values that are not acknowledged as successfully received by the communication apparatus.

A receiver address in the ACK frame or BA frame is a MAC address of the another AP.

A receiver address in the ACK frame or BA frame is a MAC address assigned by the another AP for joint transmission of the MPDUs to the communication apparatus.

Another example embodiment is a communication apparatus that comprises a receiver, which, in operation, receives a JT MAC address assigned for joint transmissions from an associated AP; and; a local memory that stores the JT MAC address; and the receiver further receiving MPDUs in which a Transmitter Address (TA) field is set as the JT MAC Address.

The communication apparatus further comprises a transmitter, which in operation, transmits an ACK frame or BA frame with the Receiver Address (RA) field set as the JT MAC Address and acknowledging the received MPDUs.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the disclosure in any way. Rather, the foregoing detailed description will provide those skilled in the art with a convenient road map for implementing exemplary embodiments of the disclosure, it being understood that various changes may be made in the function and arrangement of steps and method of operation described in the exemplary embodiments without departing from the scope of the disclosure as set forth in the appended claims.

What is claimed is:

1. An access point (AP), comprising:
circuitry, which, in operation:
encapsulates Joint Transmission (JT) data;
generates a data frame including the encapsulated JT data; and
generates a first JT trigger frame including a JT Packet identifier (ID) assigned to the encapsulated JT data, wherein the data frame omits the JT Packet ID; and
a transmitter, which, in operation:
transmits the data frame to a slave AP; and
transmits the first JT Trigger frame including the assigned JT Packet ID to initiate a JT transmission, wherein,
the circuitry, in operation, determines whether a communication apparatus failed to receive one or more MAC protocol data units (MPDUs) including the data frame that were jointly transmitted by the AP and the slave AP to the communication apparatus; and
in response to a determination that the communication apparatus failed to receive one or more of the MPDUs, the transmitter, in operation, transmits a second JT Trigger frame including the assigned JT Packet ID to the slave AP without re-distributing the failed MPDUs to the slave AP.

2. The AP of claim 1, wherein the second JT Trigger frame indicates the MPDUs to be jointly transmitted again to the communication apparatus.

3. A method, comprising:
encapsulating, at an access point (AP), Joint Transmission (JT) data;
generating, at the AP, a data frame including the encapsulated JT data;
generating a first JT trigger frame including a JT Packet ID assigned to the encapsulated JT data, wherein the data frame omits the JT Packet ID;
transmitting, by the AP, the data frame to a slave AP;
transmitting, by the AP, the first JT Trigger frame including the assigned JT Packet ID to initiate a JT transmission;
determining, by the AP, whether a communication apparatus failed to receive one or more MAC protocol data units (MPDUs) including the data frame that were jointly transmitted by the AP and the slave AP to the communication apparatus; and
in response to a determination during the determining that the communication apparatus failed to receive one or more of the MPDUs, transmitting, by the AP, a second JT Trigger frame to the slave AP without re-distributing the failed MPDUs to the slave AP.

\* \* \* \* \*